(12) United States Patent
Chou et al.

(10) Patent No.: US 11,785,480 B2
(45) Date of Patent: Oct. 10, 2023

(54) METHOD AND APPARATUS TO SUPPORT RACH OPTIMIZATION AND DELAY MEASUREMENTS FOR 5G NETWORKS

(71) Applicant: Intel Corporation, Santa Clara, CA (US)

(72) Inventors: Joey Chou, Scottsdale, AZ (US); Youn Hyoung Heo, Seoul (KR); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 17/167,626

(22) Filed: Feb. 4, 2021

(65) Prior Publication Data

US 2021/0160710 A1 May 27, 2021

Related U.S. Application Data

(60) Provisional application No. 62/972,410, filed on Feb. 10, 2020, provisional application No. 62/971,690, filed on Feb. 7, 2020.

(51) Int. Cl.
*H04W 24/02* (2009.01)
*H04W 74/08* (2009.01)
*H04W 84/04* (2009.01)

(52) U.S. Cl.
CPC ....... *H04W 24/02* (2013.01); *H04W 74/0833* (2013.01); *H04W 84/042* (2013.01)

(58) Field of Classification Search
CPC ............. H04W 24/02; H04W 74/0833; H04W 84/042; H04W 24/10
See application file for complete search history.

(56) References Cited

U.S. PATENT DOCUMENTS

2022/0217781 A1 * 7/2022 Decarreau ............. H04W 24/10

FOREIGN PATENT DOCUMENTS

WO WO-2021034246 A1 * 2/2021 ........... H04L 5/0053

OTHER PUBLICATIONS

3GPP TS 28.313 Management and orchestration; Self-Organizing Networks (SON) for 5G networks V0.2.0 (Nov. 2019) (Year: 2019).*

(Continued)

*Primary Examiner* — Ayaz R Sheikh
*Assistant Examiner* — David Zhijun Sun
(74) *Attorney, Agent, or Firm* — Schwegman Lundberg & Woessner, P.A.

(57) ABSTRACT

Systems and methods of supporting RACH optimization and monitoring of UP packet delay performance are described. During RACH optimization, a NF provisioning MnS with modify MOIAttributes operation to configure targets for RACH optimization and a NF provisioning MnS with modifyMOIAttributes operation are separately consumed to enable a RACH optimization function for a NR cell. After this, a performance assurance MnS with notifyFileReady or reportStreamData operation is consumed to collect RACH optimization-related measurements for the NR cell and RACH performance data of the RACH optimization-related measurements analyzed to evaluate RACH optimization performance for the NR cell. During monitoring of UP packet delay performance, raw performance measurements related to UP packet delay based on at least one of NG-RAN measurement results or time stamps in GTP packets are obtained from a NG-RAN or UPF, UP packet delay performance measurements are generated. UP packet delay performance could be optimized based on the performance measurements.

20 Claims, 13 Drawing Sheets

(56) References Cited

OTHER PUBLICATIONS

3GPP TS 28.532 Management and orchestration; Generic management services V15.2.0 (May 2019) (Year: 2019).*
3GPP TS 28.622 Generic Network Resource Model (NRM) Integration Reference Point (IRP); Information Service (IS) V15.4.0 (Jan. 2020) (Year: 2020).*
3GPP TS 32.522 Self-Organizing Networks (SON) Policy Network Resource Model (NRM) Integration Reference Point (IRP): Information Service (IS) V11.7.0 (Oct. 2013) (Year: 2013).*
3GPP TS 32.425 Performance Management (PM); Performance measurements Evolved Universal Terrestrial Radio Access Network (E-UTRAN) V15.3.0 (Jul. 2019) (Year: 2019).*
3GPP TS 32.156 Telecommunication management; Fixed Mobile Convergence (FMC) model repertoire V15.3.0 (Jun. 2019) (Year: 2019).*

"3GPP TS 23.501 V15.2.0", 3rd Generation Partnership Project; Technical Specification Group Services and System Aspects;System Architecture for the 5G System;Stage 2(Release 15), (Jun. 2018), 78 pgs.
"3GPP TR 21.905 V17.0.0 (Jul. 2020)", 3rd Generation Partnership Project;Technical Specification Group Services and System Aspects;Vocabulary for 3GPP Specifications(Release 17), (Jul. 2020), 12 pgs.
"3GPP TS 32.401 V16.0.0 (Jul. 2020)", 3rd Generation Partnership Project;Technical Specification Group Services and System Aspects;Telecommunication management;Performance Management (PM);Concept and requirements (Release 16), (Jul. 2020), 29 pgs.
"3GPP TS 32.404 V16.0.0(Jul. 2020)", 3rd Generation Partnership Project;Technical Specification Group Services and System Aspects;Telecommunication management;Performance Management (PM);Performance measurements; Definitions and template(Release 16), (Jul. 15, 2020), 34 pgs.

* cited by examiner

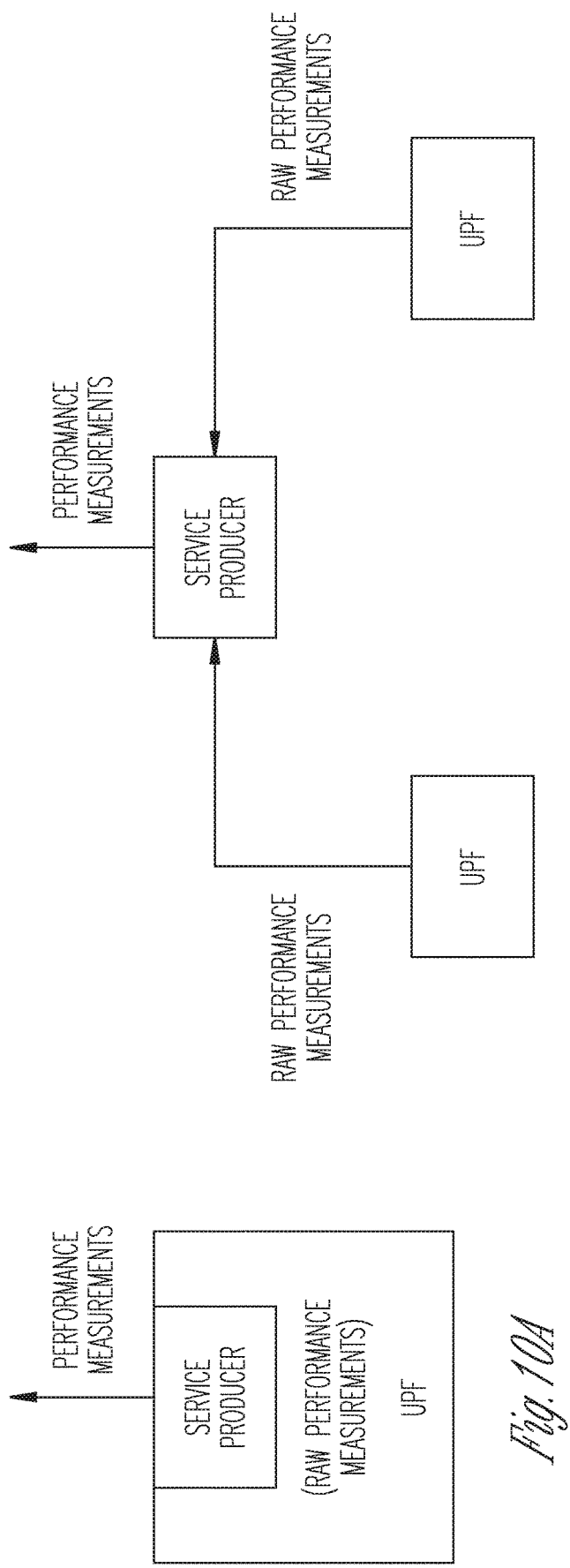

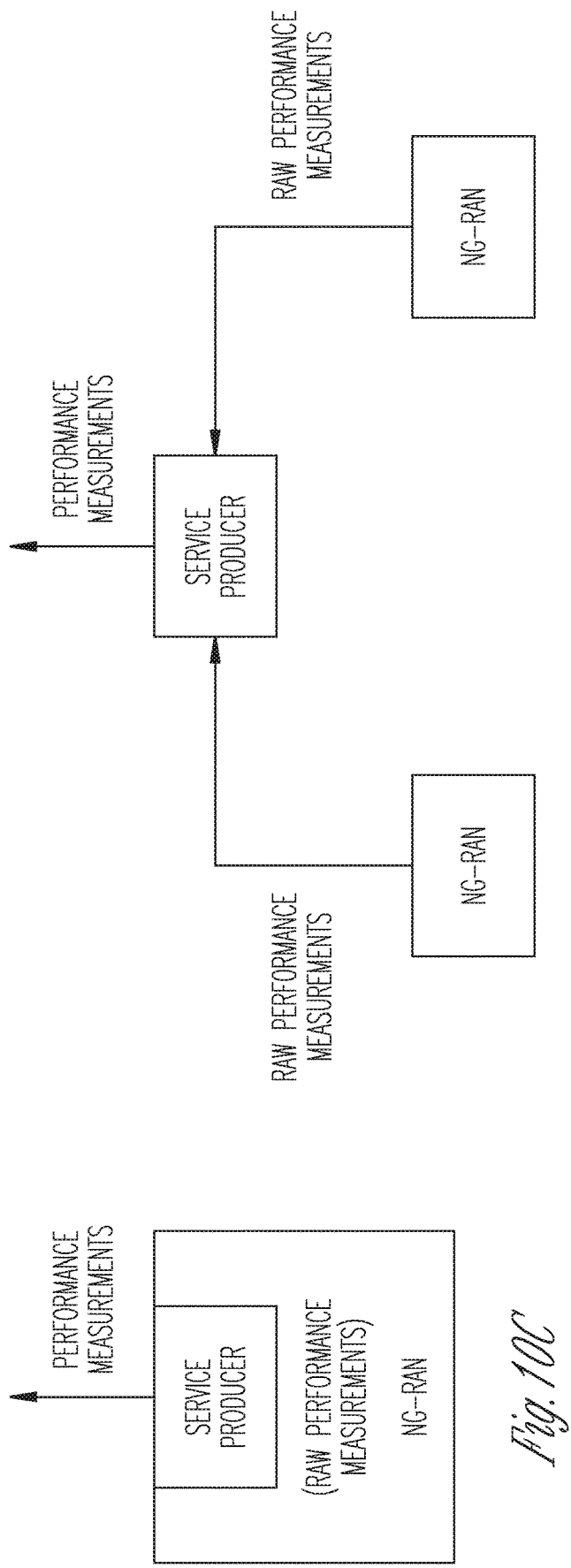

METHOD AND APPARATUS TO SUPPORT RACH OPTIMIZATION AND DELAY MEASUREMENTS FOR 5G NETWORKS

PRIORITY CLAIM

This application claims the benefit of priority under 35 U.S.C. 119(e) to U.S. Provisional Patent Application Ser. No. 62/971,690, filed Feb. 7, 2020, and U.S. Provisional Patent Application Ser. No. 62/972,410, filed Feb. 10, 2020, each of which is incorporated herein by reference in its entirety.

TECHNICAL FIELD

Embodiments pertain to radio access networks. Some embodiments relate to Third Generation Partnership Project Long Term Evolution (3GPP LTE) networks and LTE advanced (LTE-A) networks as well as 4th generation (4G) networks and 5th generation (5G) networks. Some embodiments relate to random access channel (RACH) optimization and delay measurement procedures for 5G networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed herein.

FIGS. 10A-10B illustrate a user plane function (UPF) performance measurements generation method in accordance with some embodiments.

FIGS. 10C-10D illustrate a NG radio access network (NG-RAN) performance measurements generation method in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
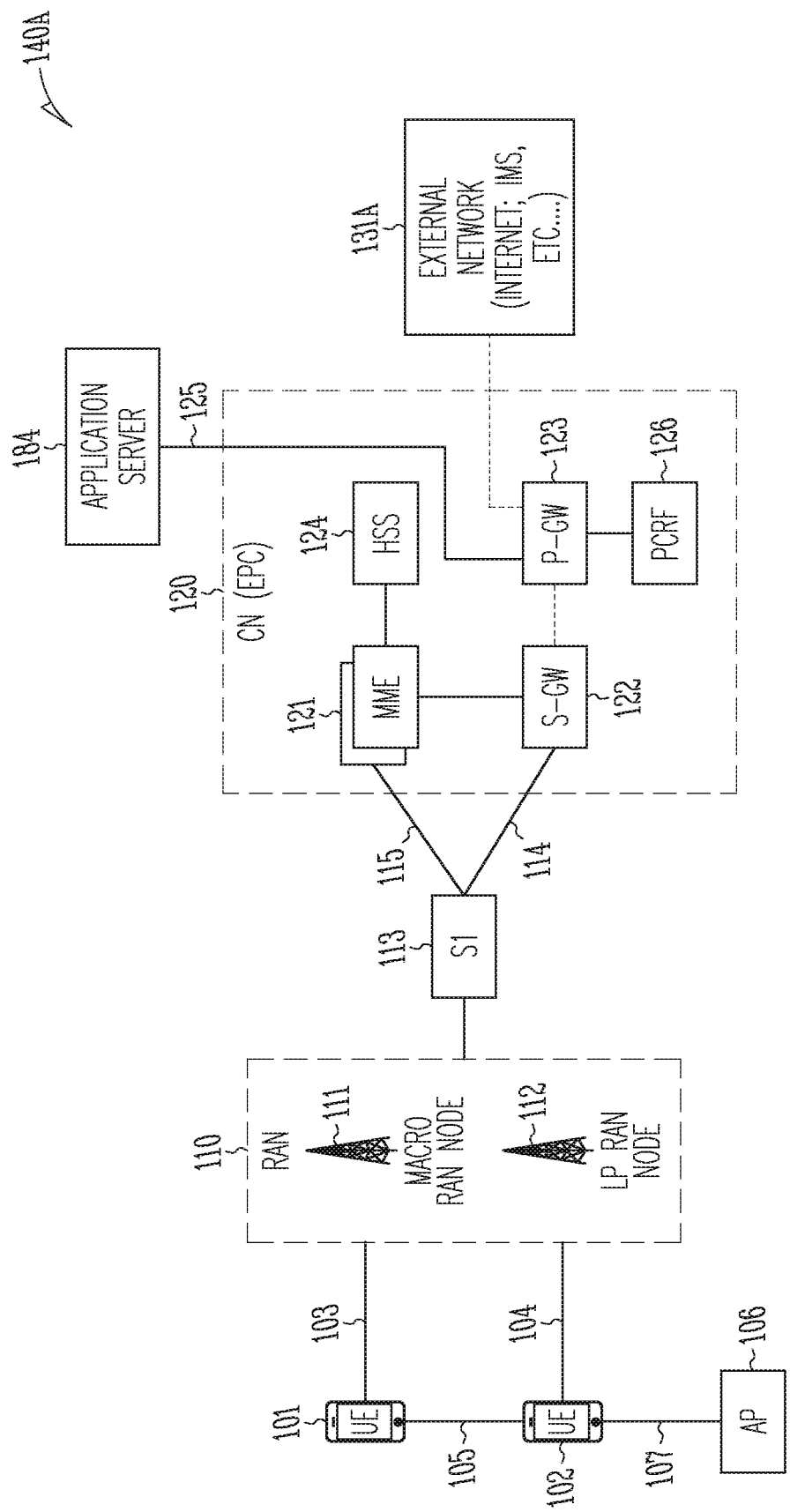
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs). Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
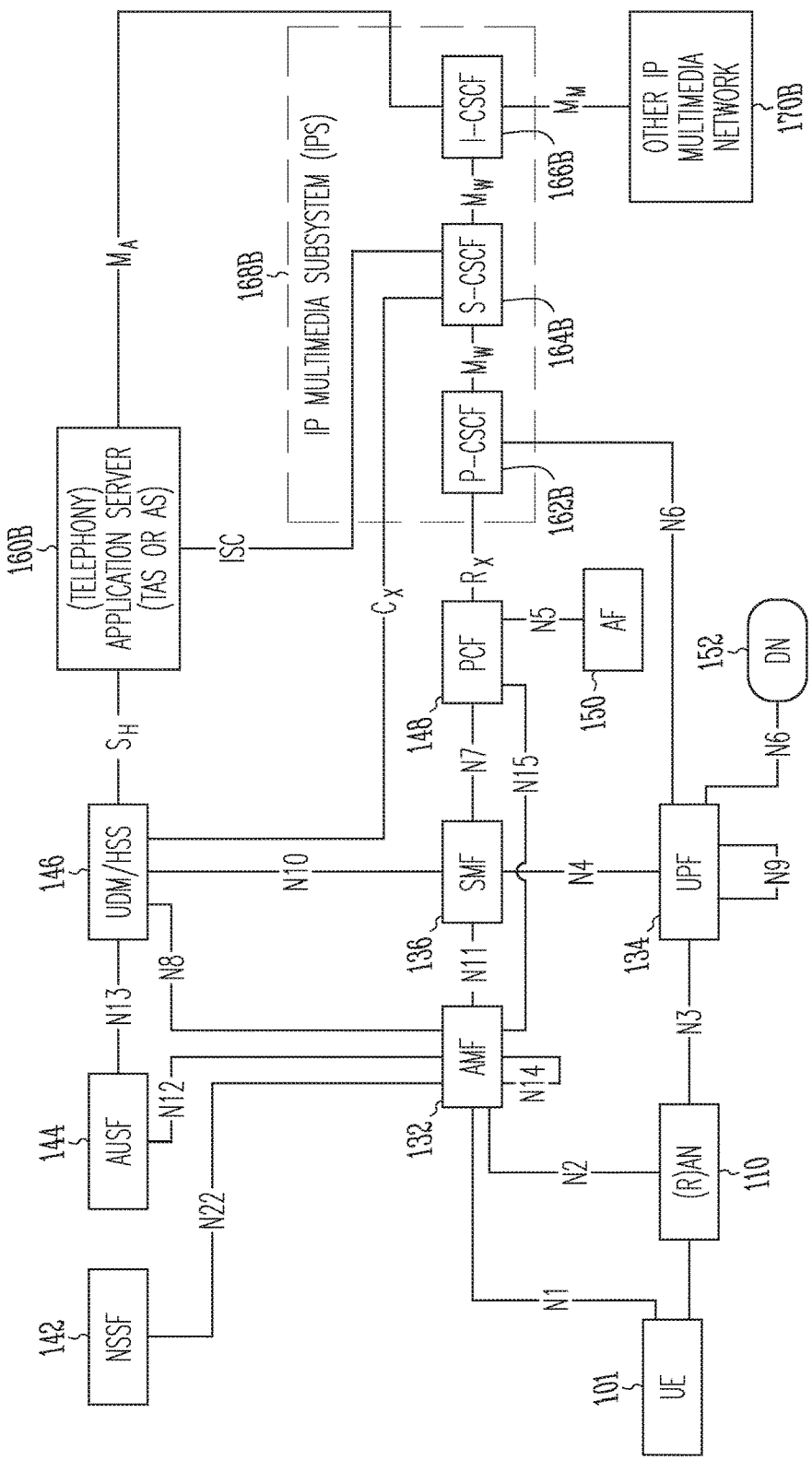
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134). N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown). N16 (between two SMFs, not shown), and N22 (between AMF 132 and NSSF 142, not shown). Other reference point representations not shown in FIG. 1E can also be used.

Figure 1C:
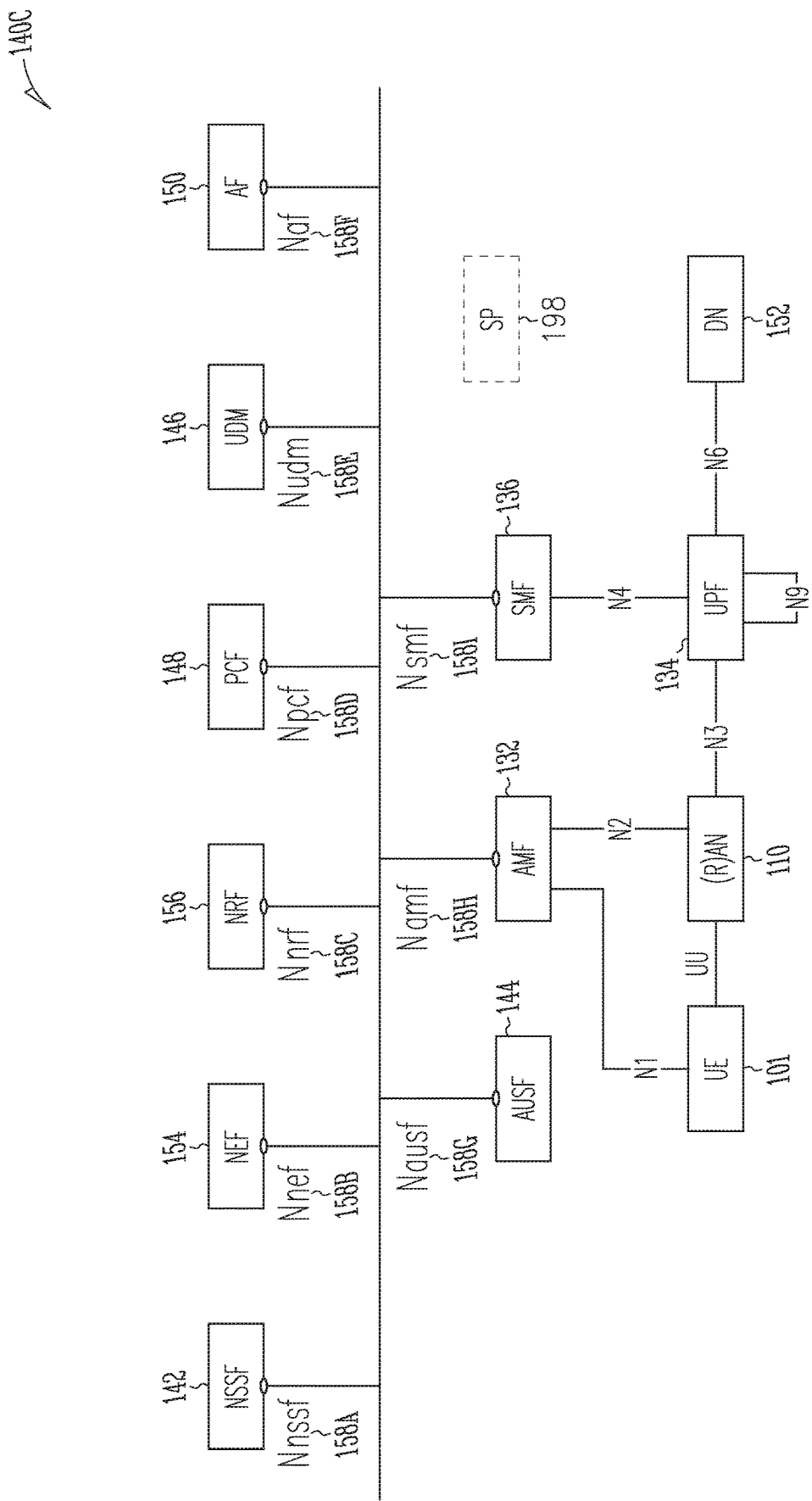
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
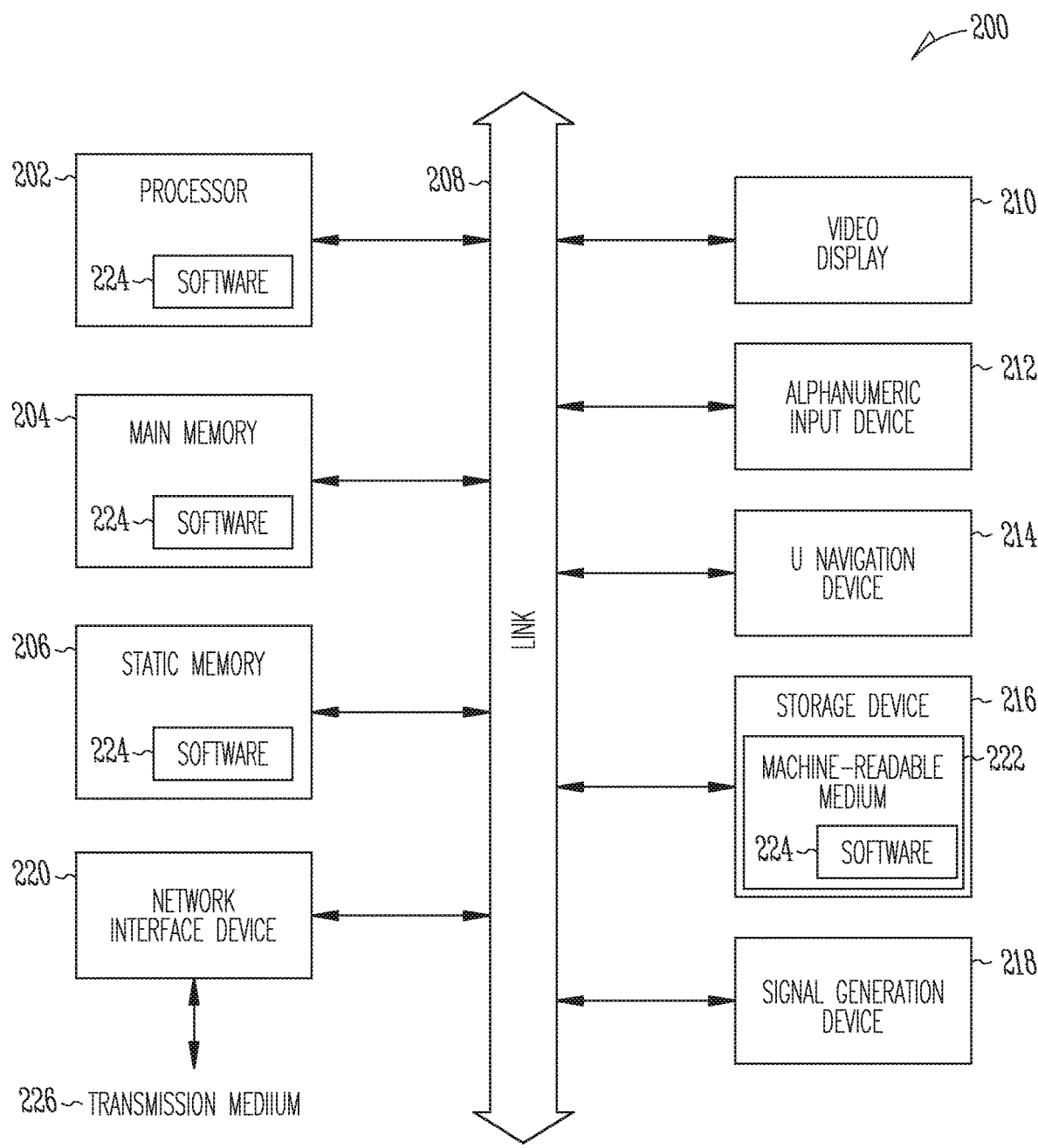
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks: Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi. IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3:
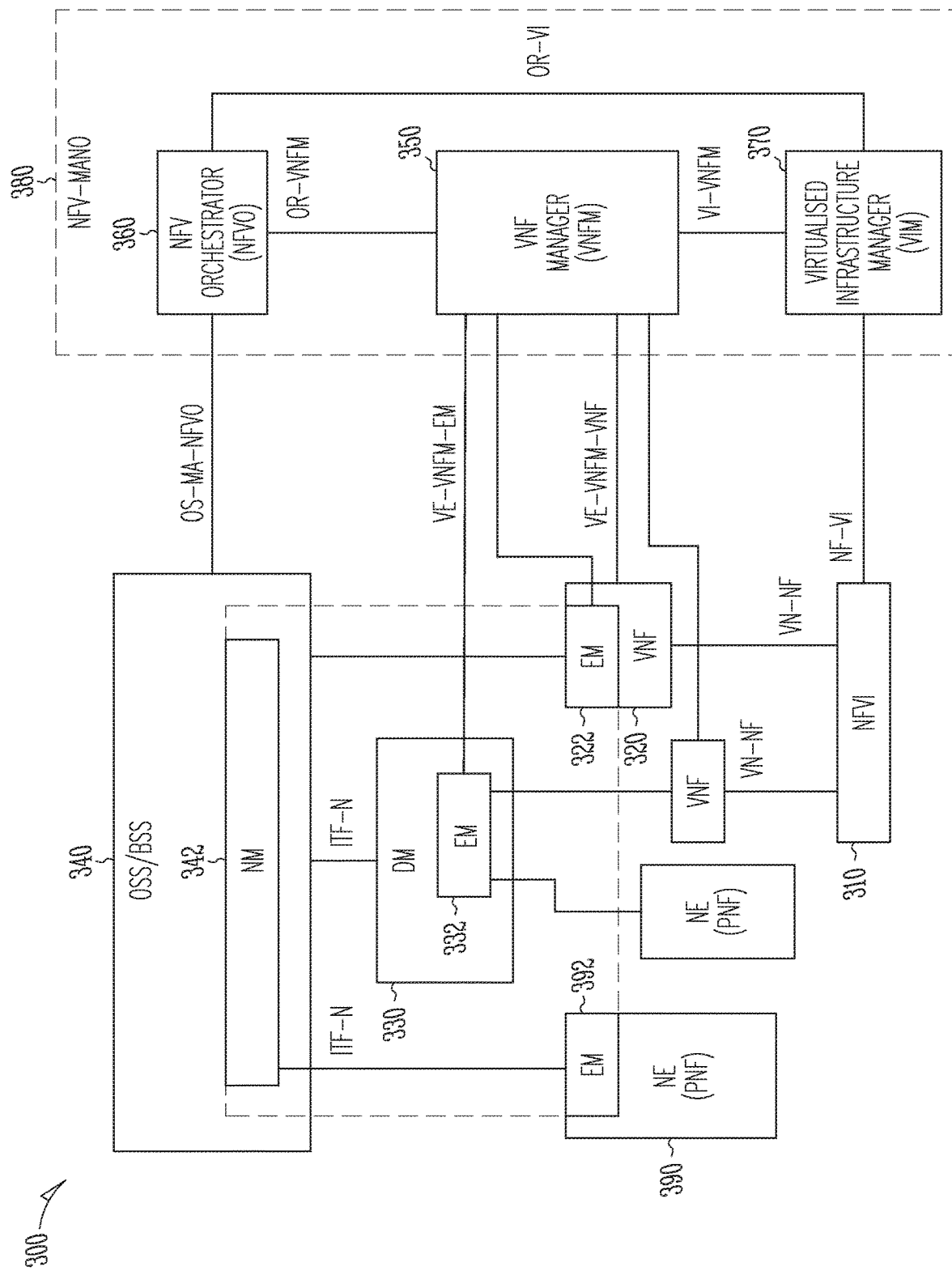
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310, Network elements (NEs) 390. Virtual Network Functions (VNFs) 310, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANOs, may comprise a Virtualized Infrastructure Manager (VIM) 370, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 334.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 310 may be instantiated in one or more servers. Each of the VNFs 310, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 310 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VNFM 350 and the EMs and NM. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 310 of the same type or of different types. Thus, although only one VNFM 350 is shown in FIG. 3, different VNFMs 350 may be associated with the different VNFs 310 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) that may provide computational abilities (CPU), one or more memories that may provide storage at either block or file-system level and one or more networking elements that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 310 can be chained with other VNFs 310 and/or other physical network function to realize a network service. The virtualized resources may provide the VNFs 310 with desired resources. Resource allocation in the NFVI 310 may simultaneously meet numerous requirements and constraints, such as low latency or high bandwidth links to other communication endpoints.

The VNFs 310, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Vi-Vnfm interface may implement a virtualized resource performance/fault management on the Vi-Vnfm reference point.

A poorly configured RACH may increase the time it takes for a UE to access the network, and may increase the accesses failures, impacting both call setup and handover performance. But, to manually configure the RACH according to various RAN conditions is a huge and costly task for operators. RACH optimization is used to automatically configure the RACH parameters in a cell in order to achieve the optimal RACH performance by reducing the network access and handoff time, as well as minimize the failures.

Figure 4:
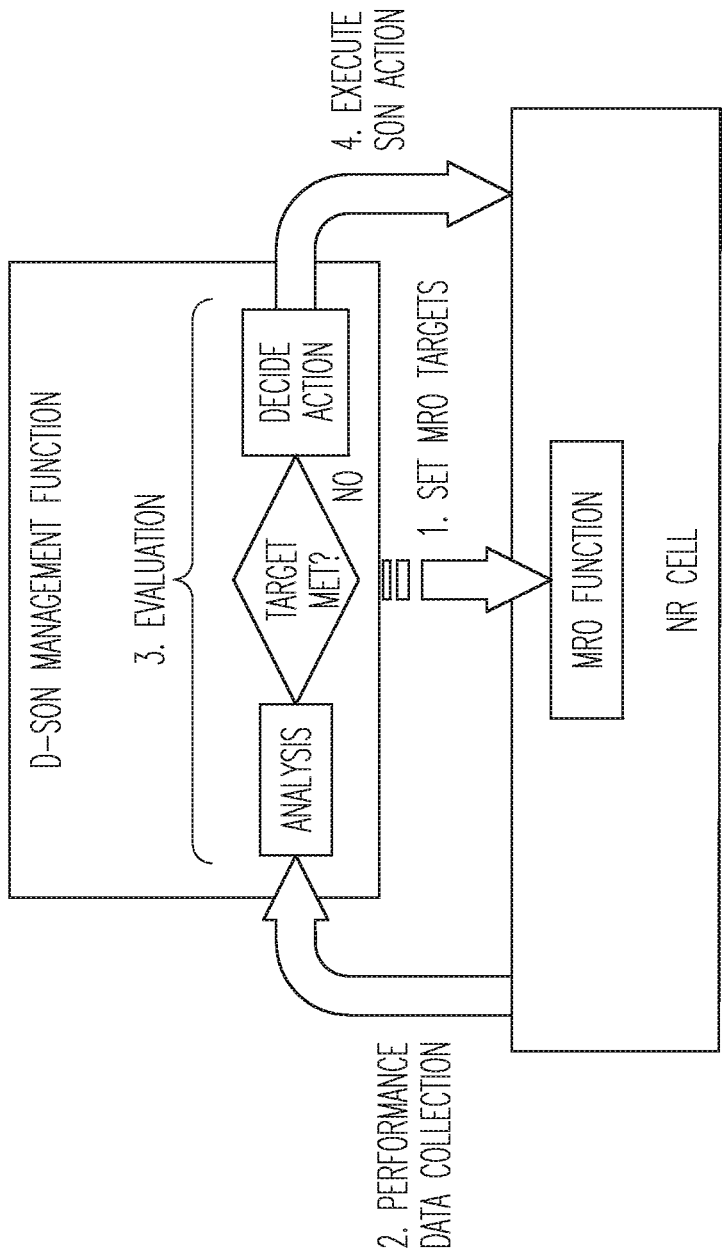
FIG. 4 illustrates a RACH optimization flow diagram in accordance with some embodiments.

FIG. 4 illustrates a RACH optimization flow diagram in accordance with some embodiments. At operation 1, the Distributed Self-Organizing Network (D-SON) management function sets the RACH optimization target at the RACH optimization function. At operation 2, the D-SON management function collects the performance data. At operation 3, the D-SON management function evaluates the RACH optimization performance by analyzing the performance data to determine if the target is met. If, not, the D-SON management function decides an action to improve the RACH optimization performance. At operation 4, the D-SON management function executes the action.

Embodiments of the RACH optimization described herein may include both RACH optimization procedures and information used to support RACH optimization.

1. RACH Optimization (Random Access Optimization)

Figure 5:
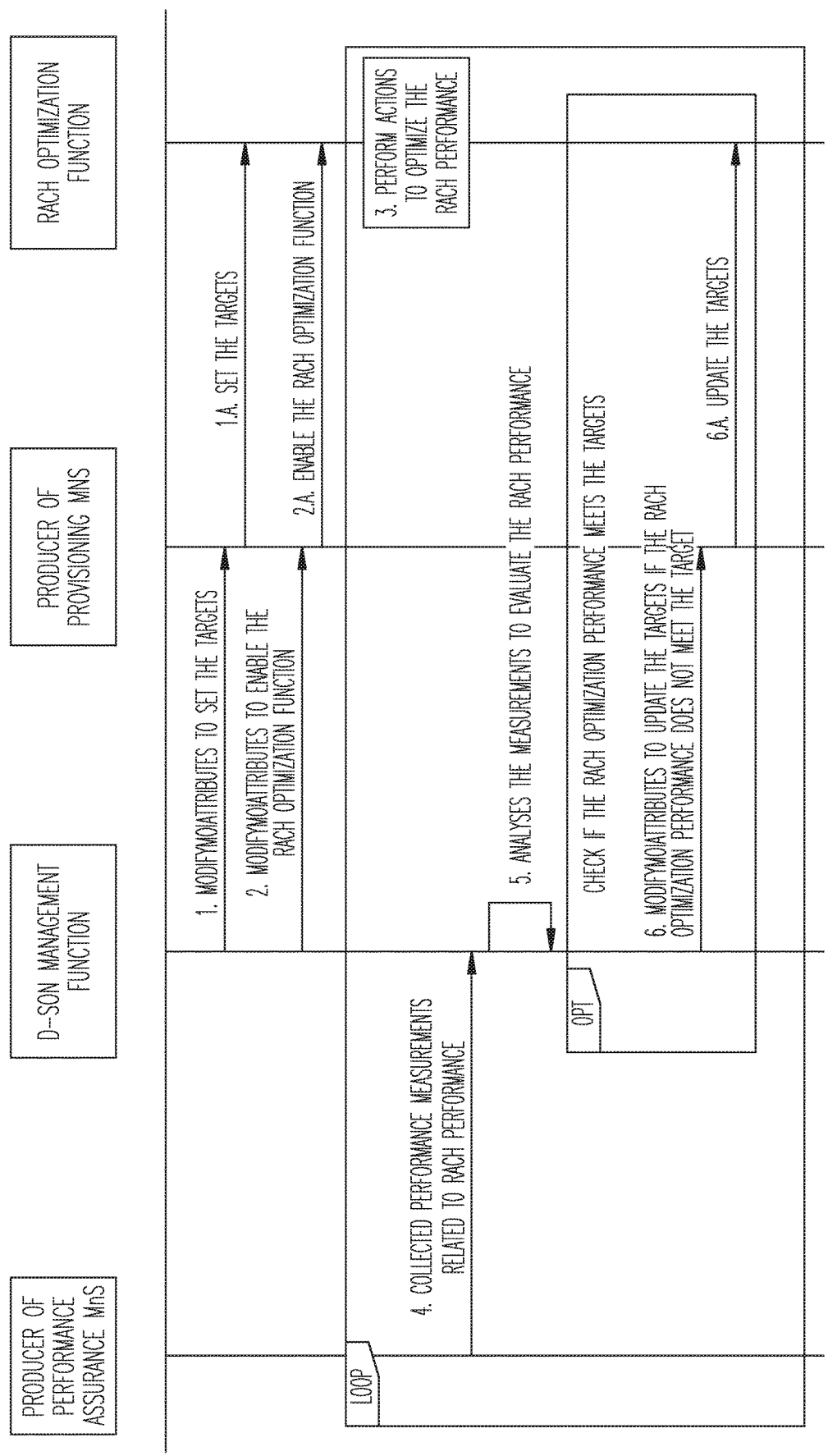
FIG. 5 illustrates a RACH optimization procedure in accordance with some embodiments.

FIG. 5 illustrates a RACH optimization procedure in accordance with some embodiments. FIG. 5 depicts a procedure that describes how D-SONmanagement function can manage the RACH optimization (D-SON) function. It is assumed that the D-SONmanagement function has consumed the performance assurance management service to collect RACH optimization related measurements.

At operation 1, the D-SON management function consumes the provisioning MnS with modifyMOIAttributes operation (see clause 5.1.3 in TS 28.532) to configure the targets for RACH optimization function.

At operation 1.a, the provisioning MnS sets the targets for RACH optimization (D-SON) function.

At operation 2, the D-SON management function consumes the management service for NF provisioning with modifyMOIAttributes operation to enable the RACH optimization function for a given NR cell.

At operation 3.a, the provisioning MnS enables the RACH optimization (D-SON) function.

At operation 3, the RACH optimization (D-SON) function receives the RACH information report from UE(s), and analyses them to determine the actions to optimize the RACH performance if the performance does not meet the targets by updating the RACH parameters.

At operation 4, the D-SON management function collects the RACH related performance measurements.

At operation 5, the D-SON management function analyses the measurements to evaluate the RACH performance.

At operation 6. The D-SON management function consumes the provisioning MnS with modifyMOIAttributes operation to update the targets of the RACH optimization function, when the RACH optimization performance does not meet the targets.

At operation 6.a, the provisioning MnS updates the targets for RACH optimization function.

2. Information to Support RACH Optimization (Random Access Optimization)

2.1 MnS Component Type A

| MnS Component Type A | Note |
|---|---|
| Operations defined in clause 5 of TS 28.532: getMOIAttributes operation modifyMOIAttributes operation notifyMOIAttributeValueChange operation | It is supported by Provisioning MnS for NF, as defined in 28.531. |
| Operations defined in clause 11.3.1.1.1 in TS 28.532 and clause 6.2.3 of TS 28.550: notifyFileReady operation reportStreamData operation | It is supported by Performance Assurance MnS for NFs, as defined in 28.550. |

Figure 6:
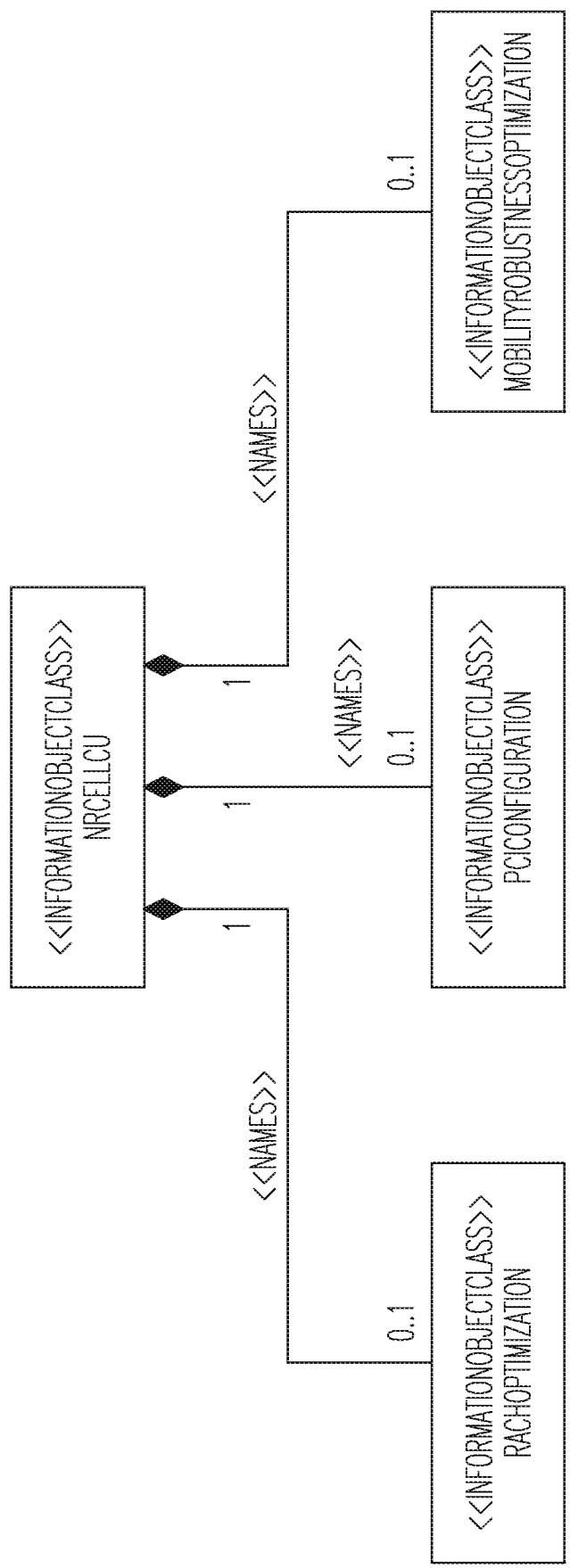
FIG. 6 illustrates a self-organizing network (SON) functions network resource model (NRM) fragment in accordance with some embodiments.

FIG. 6 illustrates a SON functions network resource model (NRM) fragment in accordance with some embodiments.

2.2 MnS Component Type B Definition

Figure 7:
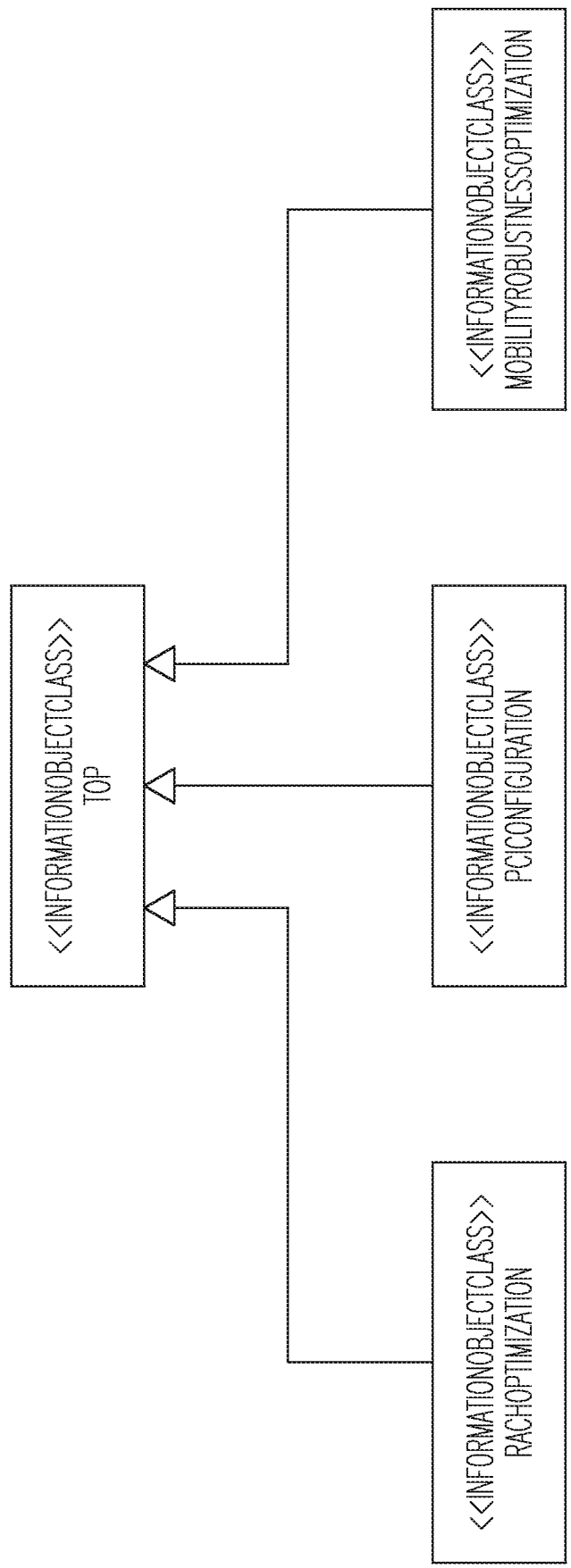
FIG. 7 illustrates inheritance hierarchy in accordance with some embodiments.

FIG. 7 illustrates inheritance hierarchy in accordance with some embodiments.

4.3.x RachOptimization 4.3.x.1 Definition

This information object class (IOC) contains attributes to support the SON function of RACH optimization (See clause 7.1.1 in TS 28.313).

4.3.x.2 Attributes

| Attribute name | Support Qualifier | isReadable | isWritable | isInvariant | isNotifyable |
|---|---|---|---|---|---|
| ueAccProbilityDistPerSSB | CM | M | M | — | M |
| ueAccDelayProbilityDistPerCSI | CM | M | M | — | M |
| ueAccDeiayProbilityDistPerSSB | CM | M | M | — | M |
| ueAccDelayProbilityDistPerCSI | CM | M | M | — | M |
| contentiousRACHAttempts PerSSB | CM | M | M | — | M |
| contentiousRACHAttempts PerCSI | CM | M | M | — | M |
| rachOptimizationControl | CM | M | M | — | M |

4.3.x.3 Attribute Constraints

| Name | Definition |
| --- | --- |
| ueAccProbilityDistPerSSB CM Support Qualifier | RACH Optimization is supported |
| ueAccProbilityDistPerCSI CM Support Qualifier | RACH Optimization is supported |
| ueAccDelayProbilityDistPerSSB CM Support Qualifier | RACH Optimization is supported |
| ueAccDelayProbilityDistPerCSI CM Support Qualifier | RACH Optimization is supported |
| contentiousRACHAttemptsPerSSB CM Support Qualifier | RACH Optimization is supported |
| contentiousRACHAttemptsPerCSI CM Support Qualifier | RACH Optimization is supported |
| rachOptimizationControl CM Support Qualifier | RACH Optimization is supported |

2.2.1 Targets Information

The targets of RACH optimization are shown in Table 7.1.1.2.1-1.

TABLE 7.1.1.2.1-1

RACH optimization targets

| Targets | Definition | Legal Values |
| --- | --- | --- |
| UE access delay probability per SSB | The probability distribution of UE access delay that is used to minimize the access delays for the UEs under the SSBs. | |
| UE access delay probability per CSI | The probability distribution of UE access delay that is used to minimize the access delays for the UEs under the CSIs. | CDF of access delay |
| Number of preambles send per SSB probability | The probability of the number of preambles sent per SSB | CDF of access delay |
| Number of preambles send per CSI probability | The probability of the number of preambles sent per SSB | CDF of access delay |
| Percentage of contentious RACH attempts per SSB | The percentage of contentious RACH attempts per SSB | [0 ... 100] in unit percentage |
| Percentage of contentious RACH attempts per SSI | The percentage of contentious RACH attempts per CSI | [0 ... 100] in unit percentage |

Target attribute definitions:

| | | |
| --- | --- | --- |
| ueAccProbilityDistPerSSB | This is a list of target Access Probability ($AP_n$) for the RACH optimization function. Each instance $AP_n$ of the list is the probability that the UE gets access on the RACH channel per SSB within n number of preambles sent over an unspecified sampling period. This target is suitable for RACH optimization. allowedValues: Each element of the list, $AP_n$, is a pair (a, n) where a is the targetProbability (in %) and n is the number of preambles sent. The legal values for a are 25, 50, 75, 90. The legal values for n are 1 to 200. The number of elements specified is 4. The number of elements supported is vendor specific. The choice of supported values for a and n is vendor specific. | type: <<data type>> multiplicity: 0 ... * isOrdered: N/A isUnique: N/A default Value: None isNullable: True |
| ueAccProbilityDistPerCSI | This is a list of target Access Probability ($AP_n$) for the RACH optimization function. Each instance $AP_n$ of the list is the probability that the UE gets access on the RACH channel per CSI within n number of preambles sent over an unspecified sampling period. This target is suitable for RACH optimization. allowedValues: Each element of the list, $AP_n$, is a pair (a, n) where a is the targetProbability (in %) and n is the number of preambles sent. The legal values for a are 25, 50, 75, 90. The legal values for n are 1 to 200. The number of elements specified is 4. The number of elements supported is vendor specific. The choice of supported values for a and n is vendor-specific. | type: <<data type>> multiplicity: 0 ... * isOrdered: N/A isUnique: N/A defaultvalue: None isNullable: True |

| | | |
|---|---|---|
| ueAccDelayProbilityDistPerSSB | This is a list of target Access Delay probability (AD$_P$) for the RACH optimization function.<br>Each instance AD$_P$ of the list is the target time before the UE gets access on the RACH channel per SSB, for the P percent of the successful RACH Access attempts with lowest access delay, over an unspecified sampling period.<br>This target is suitable for RACH optimization.<br>allowedValues: Each element of the list, AD$_P$, is a pair (p, d) where p is the targetProbability (in %) and d is the access delay (in milliseconds).<br>The legal values for p are 25, 50, 75, 90.<br>The legal values for d are 10 to 560.<br>The number of elements specified is 4.<br>The number of elements supported is vendor specific. The choice of supported values for a and b is vendor-specific. | type:<br><<data type>><br>multiplicity:<br>0 . . . *<br>isOrdered: N/A<br>isUnique: N/A<br>defaultValue: None<br>isNullable: True |
| ueAccDelayProbilityDistPerCSI | This is a list of target Access Delay probability (AD$_P$) for the RACH optimization function.<br>Each instance AD$_P$ of the list is the target time before the UE gets access on the RACH channel per CSI, for the P percent of the successful RACH Access attempts with lowest access delay, over an unspecified sampling period.<br>This target is suitable for RACH optimization.<br>allowedValues: Each element of the list, AD$_P$, is a pair (p, d) where p is the targetProbability (in %) and d is the access delay (in milliseconds).<br>The legal values for p are 25, 50, 75, 90.<br>The legal values for d are 10 to 560.<br>The number of elements specified is 4.<br>The number of elements supported is vendor specific. The choice of supported values for a and b is vendor-specific. | type:<br><<data type>><br>multiplicity:<br>0 . . . *<br>isOrdered: N/A<br>isUnique: N/A<br>defaultvalue: None<br>isNullable: True |
| contentiousRACHAttemptsPerSSB | This indicates the assigned target of the number of RACH attempts with contention detected divided by the total number of RACH attempts for each SSB.<br>This target is suitable for RACH optimization.<br>allowedValues: Integer 1 . . . 100 | type:<br><<data type>><br>multiplicity:<br>0 . . . *<br>isOrdered: N/A<br>isUnique: N/A<br>default Value: None<br>isNullable: True |
| contentiousRACHAttemptsPerCSI | This indicates the assigned target of the number of RACH attempts with contention detected divided by the total number of RACH attempts for each CSI.<br>This target is suitable for RACH optimization.<br>allowedValues: Integer 1 . . . 100 | type:<br><<data type>><br>multiplicity:<br>0 . . . *<br>isOrdered: N/A<br>isUnique: N/A<br>defaultValue: None<br>isNullable: True |

2.2.2 Control Information

The parameter is used to control the RACH optimization function.

| Control parameter | Definition | Legal Values |
| --- | --- | --- |
| RACH optimization control | This attribute allows authorized consumer to enable/disable the RACH optimization functionality. | Boolean On, off |
| rachOptimizationControl | This attribute determines whether the RACH Optimization function is enabled or disabled. allowedValues: On, Off | type: <<enumeration>> multiplicity: 1 isOrdered: N/A isUnique: N/A defaultValue: None isNullable: True |

2.3 MnS Component Type C Definition 2.3.1 Performance Measurements

Performance measurements related to the RACH optimization are captured in Table 7.2.1.3.1-1:

TABLE 7.2.1.3.1-1

RACH optimization related performance measurements

| Performance measurements | Description | Related targets |
| --- | --- | --- |
| Distribution of RACH preambles sent per SSB | Distribution of the number of preambles UEs sent to achieve synchronization per SSB, where the number of preambles sent corresponds to PREAMBLE_TRANSMISSION_COUNTER (see clause 5.1.1 in TS 38.321) in UE. | UE access delay probability per SSB |
| Distribution of RACH preambles sent per CSI | Distribution of the number of preambles UEs sent to achieve synchronization per CSI, where the number of preambles sent corresponds to PREAMBLE_TRANSMISSION_COUNTER (see clause 5.1.1 in TS 38.321) in UE. | UE access delay probability per CSI |
| Distribution of UEs access delay per SSB | Distribution of the time needed for UEs to successfully attach to the network per SSB. | Number of preambles send per SSB probability |
| Distribution of UEs access delay per CSI | Distribution of the time needed for UEs to successfully attach to the network per CSI. | Number of preambles send per CSI probability |
| Mean number of preambles received per cell | Mean number of dedicated, randomly at low range, or at high range preambles received per cell. | UE access delay probability per SSB |
| Mean number of preambles received per SSB | Mean number of dedicated, randomly at low range, or at high range preambles received per SSB. | UE access delay probability per SSB |
| Percentage of contentious RACH attempts per SSB | Percentage of contentious RACH attempts received per SSB | Percentage of contentious RACH attempts per SSB |
| Percentage of contentious RACH attempts per CSI | Percentage of contentious RACH attempts received per CSI | Percentage of contentious RACH attempts per SSI |

Performance Measurements Definitions:

5.x Measurements related to RACH 5.x.1 Mean number of RACH preambles received per cell a) This measurement provides the mean number of RACH preambles received in a cell. Separate counts are provided for dedicated preambles, randomly selected preambles in group A (aka "low range") and randomly selected preambles in group B (aka "high range").

b) CC.

c) This measurement is obtained by collecting the measurements of "Received Random Access Preambles per cell" where the unit of measured value is per second, as defined in 38.314 [x] in the granularity period, and then taking the arithmetic mean of these measurements. Separate measurements are obtained based on the following measurements contained in "Received Random Access Preambles per cell" measurement:

Dedicated preambles

Randomly selected preambles in the low range

Randomly selected preambles in the high range.

d) Each measurement is an integer value.

e) RACH.PreambleDedMean

RACHPreambleGroupAMean

RACH.PreambleGroupBMean f) NRCellCU.

g) Valid for packet switched traffic.

h) 5GS.

i) One usage of this measurement is to support RACH optimization (see TS 28.313).

5.x.2 Mean number of RACH preambles received per SSB a) This measurement provides the mean number of RACH preambles received per SSB. Separate counts are provided for dedicated preambles, randomly selected preambles in group A (aka "low range") and randomly selected preambles in group B (aka "high range").

b) CC.

c) This measurement is obtained by collecting the measurements of "Received Random Access Preambles per SSB" where the unit of measured value is per second, as defined in 38.314 [x] in the granularity period, and then taking the arithmetic mean of these measurements. Separate measurements are obtained based on the following measurements contained in "Received Random Access Preambles per cell" measurement:

Dedicated preambles
Randomly selected preambles in the low range
Randomly selected preambles in the high range
This measurement has a subcounter that is identified by ssb-SSB index.

d) Each measurement is an integer value.

e) RACH.PreambleDedMean.ssb
RACH.PreambleGroupAMean.ssb
RACH.PreambleGroupBMean.ssb
Where ssb represents the subcounter associated with SSB.

f) NRCellCU.

g) Valid for packet switched traffic.

h) 5GS.

i) One usage of this measurement is to support RACH optimization (see TS 28.313).

5.x.3 Distribution of RACH preambles per SSB sent a) This measurement provides the distribution of number of RACH preambles per SSB sent by the UE, as reported by the UEs inside the RACH-Report-r16 IEs in UEInformationResponse-r16 message. The measurement is incremented each time a UEInformationResponse-r16 message containing RACH-Report-r16 IE is received.

b) CC.

c) This measurement is obtained by incrementing the measurement bin that is identified by [ssb, Bin], where ssb corresponds to ssb-Index-r16 IE, and Bin corresponds to numberOfPreamblesSentOnSSB-r16 IE for each RACH-Report-r16 received from UE. The numberOfPreamblesSentOnSSB-r16 IE and ssb-Index-r16 IE are contained in PerRACHSSBInfo-r16 IE in RACH-Report-r16.

d) Each measurement is an integer value.

e) RACH.PreamblePerSsbDist.ssb.Bin
where ssb is to identify the measurement associated with SSB index. Bin is to identify the bins associated with the number of preambles sent. NOTE: Number of Bin and the range for each bin is left to implementation.

f) NRCellCU.

g) Valid for packet switched traffic.

h) 5GS.

i) One usage of this measurement is to support RACH optimization (see TS 28.313).

5.x.4 Distribution of RACH preambles per CSI sent a) This measurement provides the distribution of number of RACH preambles per CSI sent by the UE, as reported by the UEs inside the RACH-Report-r16 IEs in UEInformationResponse-r16 message. The measurement is incremented each time a UEInformationResponse-r16 message containing RACH-Report-r16 IE is received.

b) CC.

c) This measurement is obtained by incrementing the measurement bin that is identified by [csi, Bin], where csi corresponds to csi-RS-Index-r16 IE, and Bin corresponds to numberOfPreamblesSentOnCSI-RS-r16 IE for each RACH-Report-r16 received from UE. The numberOfPreamblesSentOnCSI-RS-r6IE and csi-RS-Index-r16 IE are contained in PerRACHCSI-RSInfo-r16 IE in RACH-Report-r16.

d) Each measurement is an integer value.

e) RACH.PreamblePerCsiDist.csi.Bin
where csi is to identify the bins associated with CSI RS index, Bin is to identify the bins associated with the number of preambles sent. NOTE: Bin and the range for each bin is left to implementation.

f) NRCellCU.

g) Valid for packet switched traffic.

h) 5GS.

i) One usage of this measurement is to support RACH optimization (see TS 28.313).

5.x.5 Distribution of RACH access delay per SSB a) This measurement provides the distribution of the RACH access delay per SSB that is the interval from the time a UE sends its first RACH preamble until the UE is attached to the network. The measurement is incremented each time a UEInformationResponse-r16 message containing RACH-Report-r16 IE is received.

b) CC.

c) This measurement is obtained by incrementing the measurement bin that is identified by [ssb, Bin], where ssb corresponds to ssb-Index-r16 IE, and Bin corresponds to the UE RACH access delay for each RACH-Report-r16 received from UE. The access delay is calculated based upon the value of numberOfPreamblesSentOnSSB-r16 IE and contentionDetected-r16 IE in PerRACHAttemptInfo-r16, where numberOfPreamblesSentOnSSB-r16 IE, ssb-Index-r16, and PerRACHAttemptInfo-r16 IE are contained in PerRACHSSBInfo-r16 IE in RACH-Report-r16.

d) Each measurement is an integer value.

e) RACH.AccessDelayPerSsb.ssb.Bin
where ssb is to identify the bins associated with the SSB index, Bin is to identify the bins associated with the RACH access delay. NOTE: Bin and the range for each bin is left to implementation.

f) NRCellCU.

g) Valid for packet switched traffic.

h) 5GS.

i) One usage of this measurement is to support RACH optimization (see TS 28.313).

5.x.6 Distribution of RACH access delay per CSI a) This measurement provides the distribution of the RACH access delay per CSI that is the interval from the time a UE sends its first RACH preamble until the UE is attached to the network. The measurement is incremented each time a UEInformationResponse-r16 message containing RACH-Report-r16 IE is received.

b) CC.

c) This measurement is obtained by incrementing the measurement bin that is identified by [csi, Bin], where csi corresponds to csi-RS-Index-r16 IE, and Bin corresponds to the UE RACH access delay for each RACH-Report-r16 received from UE. The access delay is calculated based upon the value of numberOfPreamblesSentOnCSI-r16 IE and contentionDetected IE in PerRACHAttemptInfo-r16, where numberOfPreamblesSentOnCSI-r16 IE, csi-RS-Index-r16, and PerRACHAttemptInfo-r16 IE are contained in PerRACHCSI-RSInfo-r16 IE in RACH-Report-r16.

d) Each measurement is an integer value.

e) RACH.AccessDelayPerCsi.csi.Bin
where csi is to identify the bins associated with the CSI RS index, Bin is to identify the bins associated with the RACH access delay. NOTE: Bin and the range for each bin is left to implementation.

f) NRCellCU.

g) Valid for packet switched traffic.

b) 5GS.

i) One usage of this measurement is to support RACH optimization (see TS 28.313).

5.x.7 Percentage of contentious RACH attempts per SSB a) This measurement provides the percentage of PerRACHAttemptInfo-r16 with contentionDetected-r16 IE set to TRUE among all PerRACHSSBInfo-r16 message received within the measurement granularity interval.

b) SI.

c) This measurement is obtained by dividing the number of PerRACHAttemptInfo-r16 with contentionDetected-r16 IE set to TRUE by the total number of PerRACHSSBInfo-r16 message received within the measurement granularity interval. This measurement has a subcounter, identified by ssb that corresponds to ssb-Index-r16 IE, where PerRACHAttemptInfo-r16 and ssb-Index-r16 IE are contained in PerRACHSSBInfo-r16 IE.

d) Each measurement is a percentage.

e) RACH.contentiousAttemptPerSsb.ssb where ssb is to identify the bins associated with the SSB index, f) NRCellCU.

g) Valid for packet switched traffic.

h) 5GS.

i) One usage of this measurement is to support RACH optimization (see TS 28.313).

5.x.8 Percentage of contentious RACH attempts per CSI a) This measurement provides the percentage of PerRACHAttemptInfo-r16 with contentionDetected-r16 IE set to TRUE among all PerRACHCSI-RSInfo-r16 message received within the measurement granularity interval.

b) SI.

c) This measurement is obtained by dividing the number of PerRACHAttemptInfo-r16 with contentionDetected-r16 IE set to TRUE by the total number of PerRACHCSI-RSInfo-r16 message received within the measurement granularity interval. This measurement has a subcounter, identified by csi that corresponds to csi-RS-Index-r16 IE, where PerRACHAttemptInfo-r16 and csi-RS-Index-r16 IE are contained in PerRACHCSI-RSInfo-r16 IE.

d) Each measurement is a percentage.

e) RRU.contentiousAttemptPerCsi.csi where csi is to identify the bins associated with the CSI RS index.

f) NRCellCU.

g) Valid for packet switched traffic.

h) 5GS.

i) One usage of this measurement is to support RACH optimization (see TS 28.313).

5.x.9 Number of UE RACH reports received per SSB a) This measurement provides the number of RACH-Report-r6 messages received within the measurement granularity interval containing PerRACHSSBInfo-r16 IE.

b) CC.

c) This measurement is obtained by incrementing the measurement bin that is identified by ssb, where ssb corresponds to ssb-Index-r16 IE for each RACH-Report-r6 message containing PerRACHSSBInfo-r16 IE is received from UE. The ssb-Index-r16 IE is contained in PerRACHSSBInfo-r16 IE.

d) Each measurement is an integer value.

e) RACH.numberOfReportPerSsb.ssb where ssb is to identify the bins associated with the SSB index, f) NRCellCU.

g) Valid for packet switched traffic.

h) 5GS.

i) One usage of this measurement is to support RACH optimization (see TS 28.313).

5.x.10 Number of UE RACH reports received per CSI a) This measurement provides the number of RACH-Report-r6 messages received within the measurement granularity interval containing PerRACHCSI-RSInfo-r16 IE.

b) CC.

c) This measurement is obtained by incrementing the measurement bin that is identified by csi, where csi corresponds to csi-RS-Index-r16 IE for each RACH-Report-r16 message containing PerRACHCSI-RSInfo-r16 IE is received from UE. The csi-RS-Index-r16 IE is contained in PerRACHCSI-RSInfo-r16 IE.

d) Each measurement is an integer value.

e) RACH.numberOfReportPerCsi.csi where csi is to identify the bins associated with the CSI RS index, f) NRCellCU.

g) Valid for packet switched traffic.

h) 5GS.

i) One usage of this measurement is to support RACH optimization (see TS 28.313).

Figure 8:
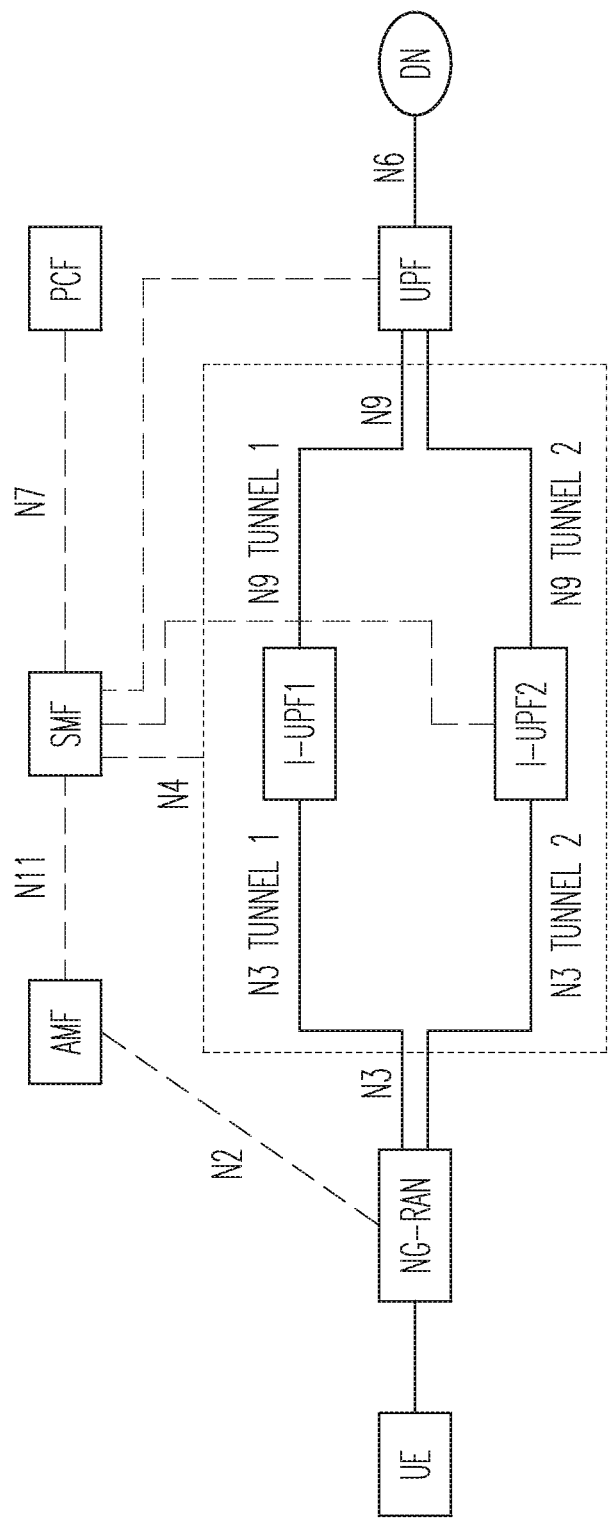
FIG. 8 illustrates user plane data delay in a 5G network in accordance with some embodiments.

In some embodiments, user plane data delay measurements in a 5G network may be monitored. FIG. 8 illustrates user plane data delay in a 5G network in accordance with some embodiments. The e2e packet delay between the UE and PDU session anchor (PSA) UPF is a combination of the UL/DL packet delay between the NG-RAN and PSA UPF and the delay occurred in the NG-RAN (including the delay in the NG-RAN and on the Uu interface).

If the NG-RAN and PSA UPF are time synchronized, the one-way packet delay monitoring between the NG-RAN and PSA UPF is supported. The time stamp in the GTP-U header is used for UL/DL packet delay measurement. The QoS Monitoring Packet (QMP) indicator which indicates the packet used for UL/DL packet delay measurement is also contained in the GTP-U header. PSA UPF and NG-RAN calculates the UL packet delay and DL packet delay between NG-RAN and PSA UPF respectively based on the received time stamp in GTP-U header of service packet and the local time. NG-RAN encapsulates the DL packet delay result and the UL/DL packet delay result on Uu interface in the GPRS Tunneling Protocol (GTP)-U header of the UL packet data sent to the PSA UPF. The NG-RAN sends a dummy UL packet as the monitoring response packet to the PSA UPF in case there is no UL service packet for UL packet delay monitoring.

If the NG-RAN and PSA UPF are not time synchronized, it is assumed that the UL packet delay and the DL packet delay between the NG-RAN and PSA UPF is the same. The PSA UPF creates and sends the monitoring packets to the RAN:

The PSA UPF encapsulates in the GTP-U header with Quality of service (QoS) Flow ID (QFI), tunnel endpoint identifier (TEID), QoS Monitoring Packet (QMP) indicator and the local time T1 that sent the DL monitoring packets.

The NG-RAN records the local time T1 received in the GTP-U header and the local time T2 at the reception of the DL monitoring packets. The NG-RAN initiates UL/DL packet delay measurement on the Uu interface.

When receiving the UL packet from UE or when the NG-RAN sends the dummy UL packet as monitoring response, the NG-RAN encapsulates QMP indicator, the UL/DL packet delay result of Uu interface, the time T1 received in the GTP-U header, the local time T2 at the reception of the DL monitoring packets and local time T3 when NG-RAN sends out this monitoring response packet to the UPF via N3 interface, in the GTP-U header of the monitoring response packet.

The PSA UPF records the local time T4 when receiving the monitoring response packets and calculates the round trip and UL/DL packet delay between the NG-RAN and anchor PSA UPF based on the time information contained in the GTP-U header of the received monitoring response packets. The PSA UPF calculates the UL/DL packet delay between UE and the PSA UPF based on the received UL/DL packet delay results of the Uu interface and UL/DL packet delay between the RAN and the PSA UPF. The PSA UPF reports the result to the SMF based on some specific condition, e.g. when threshold for reporting to the SMF is reached.

The DL/UL delay has direct impact to users' experience for some types of services (e.g., URLLC). The DL/UL delay between the PSA UPF and the NG-RAN is part of the end to end one-way delay and is not expected to be very long compared to the delay in between the NG-RAN and the UE. In case the PSA UPF and the NG-RAN are time synchronized, the DL one-way delay can be measured by the NG-RAN, and the UL one-way delay can be measured by the PSA UPF. In case the PSA UPF and the NG-RAN are not time synchronized, the one-way DL/UL delay cannot be measured and instead the round trip packet delay can be measured at the PSA UPF.

The end-to-end DL/UL delay in 5G networks between the UE and the PSA UPF has direct impact to users' experience for some types of services (e.g., URLLC). In case the PSA UPF and the NG-RAN are time synchronized, the DL/UL delay between the PSA UPF and the UE can be measured at the PSA UPF.

Among other things, various embodiments herein may generate performance measurements related to user plane packet delay based on time stamps in the GTP packets and/or the NG-RAN measurement results. Among other things, the performance measurements related to user plane data delay can be used to reflect the users experience and optimize the delay performance when desired.

5G NF Performance Measurements Generation

Figure 9:
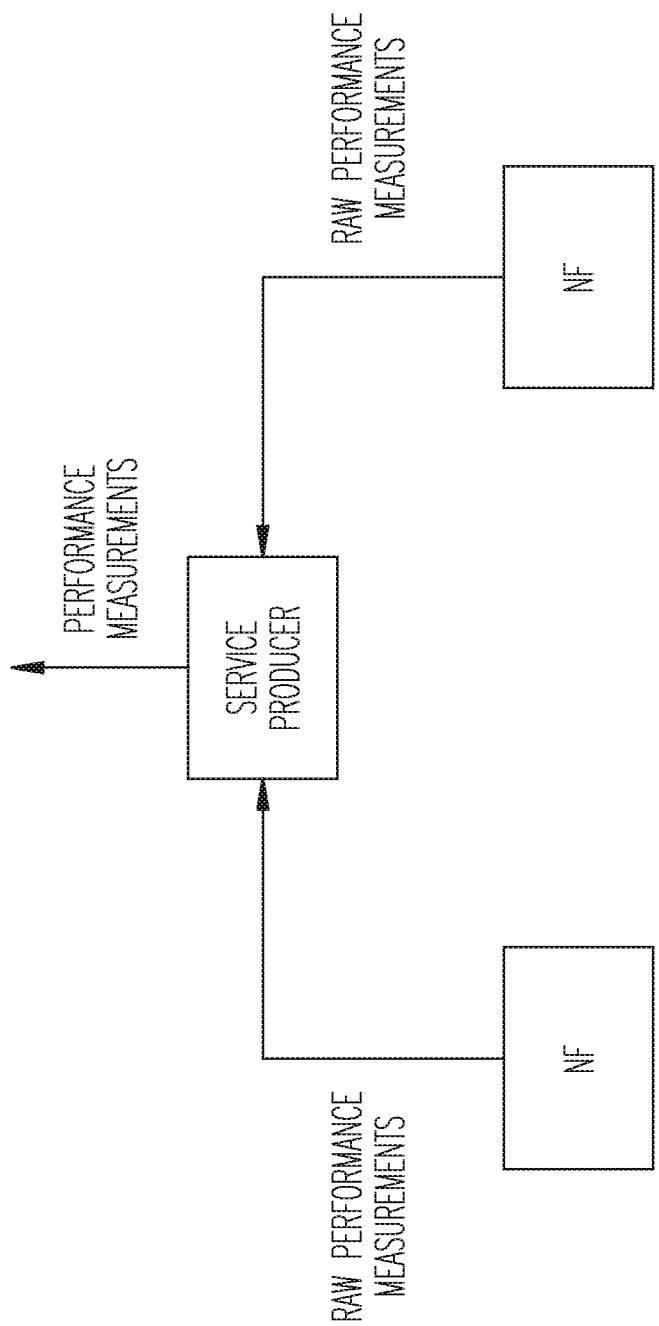
FIG. 9 illustrates a 5G network function (NF) performance measurements generation method in accordance with some embodiments.

FIG. 9 illustrates a 5G network function (NF) performance measurements generation method in accordance with some embodiments. FIGS. 10A-OB illustrate a user plane function (UPF) performance measurements generation method in accordance with some embodiments. FIGS. 10C-10D illustrate a NG radio access network (NG-RAN) performance measurements generation method in accordance with some embodiments.

In some embodiments, a service producer collects the raw performance measurements from NFs, and then generates the performance measurements for NFs for its consumers. In some embodiments, the NF is a UPF or gNB (gNB-CU-UP), and the service producer may be implemented within the NF or in a separate management system.

2. Performance Measurements 5.1.1.x DL packet delay between NG-RAN and PSA UPF 5.1.1.x.1 Average DL GTP packet delay between PSA UPF and NG-RAN a) This measurement provides the average DL GTP packet delay between PSA UPF and NG-RAN. This measurement is split into subcounters per 5QI and subcounters per Single Network Slice Selection Assistance Information (S-NSSAI). This measurement is only applicable to the case the PSA UPF and the NG-RAN are time synchronized.

b) DER (n=1).

c) The measurement is obtained by the following method:
For each DL GTP PDU (packet i) encapsulated with QFI, TEID, and QMP indicator for QoS monitoring, the gNB records the following time stamps and information:
T1 received in the GTP-U header indicating the local time that the DL GTP PDU was sent by the PSA UPF:
T2 that the DL GTP PDU was received by NG-RAN:
The 5QI and S-NSSAI associated to the DL GTP PDU.

The gNB counts the number (N) of DL GTP PDUs encapsulated with the QFI. TEID, and QMP indicator for each 5QI and each S-NSSAI respectively, and takes the following calculation for each 5QI and each S-NSSAI:

$$\frac{\sum_{i=1}^{N}(T2_i - T1_i)}{N}$$

d) Each measurement is a real number representing the average delay in microseconds.

e) GTP.DelayDlPsaUpfNgranMean.5QI, where 5QI identifies the 5QI;
GTP.DelayDlPsaUpfNgranMean.SNSSAI, where SNSSAI identifies the S-NSSAI.

f) EP_N3 (contained by GNBCUUPFunction).

g) Valid for packet switched traffic.

h) 5GS.

5.1.1.x.2 Distribution of DL GTP packet delay between PSA UPF and NG-RAN a) This measurement provides the distribution of DL GTP packet delay between PSA UPF and NG-RAN. This measurement is split into subcounters per 5QI and subcounters per S-NSSAI. This measurement is only applicable to the case the PSA UPF and NG-RAN are time synchronized.

b) DER (n=1).

c) The measurement is obtained by the following method:
For each DL GTP PDU (packet i) encapsulated with the QFI, TEID, and QMP indicator for QoS monitoring, the gNB records the following time stamps and information:
T1 received in the GTP-U header indicating the local time that the DL GTP PDU was sent by the PSA UPF;
T2 that the DL GTP PDU was received by the NG-RAN:
The 5QI and S-NSSAI associated to the DL GTP PDU.

The gNB 1) takes the following calculation for each DL GTP PDU (packet i) encapsulated with the QFI. TEID, and QMP indicator for each 5QI and each S-NSSAI respectively, and 2) increments the corresponding bin with the delay range where the result of 1) falls into by 1 for the subcounters per 5QI and subcounters per S-NSSAI.

$T2_i - T1_i$ d) Each measurement is an integer representing the number of GTP PDUs measured with the delay within the range of the bin.

e) GTP.DelayDlPsaUpfNgranDist.5QI.Bin, where Bin indicates a delay range which is vendor specific, and 5QI identifies the 5QI; GTP.DelayDlPsaUpfNgranDist.SNSSAI.bin, where Bin indicates a delay range which is vendor specific, and SNSSAI identifies the S-NSSAI.

f) EP_N3 (contained by GNBCUUPFunction).

g) Valid for packet switched traffic.

h) 5GS.

5.4.x One-way packet delay between NG-RAN and PSA UPF 5.4.x.1 UL packet delay between NG-RAN and PSA UPF 5.4.x.1.1 Average UL GTP packet delay between PSA UPF and NG-RAN a) This measurement provides the average UL GTP packet delay between the PSA UPF and the NG-RAN. This measurement is split into subcounters per 5QI and subcounters per S-NSSAI. This measurement is only applicable to the case in which the PSA UPF and the NG-RAN are time synchronized.

b) DER (n=1).

c) The measurement is obtained by the following method: For each GTP PDU monitoring response packet (packet i) for QoS monitoring, the PSA UPF records the following time stamps and information:

T3 received in the GTP-U header of the monitoring response packet indicating the local time that the monitoring response packet was sent by the NG-RAN;

T4 that the monitoring response packet was received by the PSA UPF;

The 5QI and S-NSSAI associated to the GTP PDU.

The PSA UPF counts the number (N) of GTP PDU monitoring response packets for each 5QI and each S-NSSAI respectively, and takes the following calculation for each 5QI and each S-NSSAI:

$$\frac{\sum_{i=1}^{N}(T4_i - T3_i)}{N}$$

d) Each measurement is a real number representing the average delay in microseconds.

e) GTP.DelayUlPsaUpfNgranMean.5QI, where 5QI identifies the 5QI; GTP.DelayUlPsaUpfNgranMean.SNSSAI, where SNSSAI identifies the S-NSSAI.

f) EP_N3 (contained by UPFFunction); EP_N9 (contained by UPFFunction).

g) Valid for packet switched traffic.

h) 5GS.

5.4.x.1.2 Distribution of UL GTP packet delay between PSA UPF and NG-RAN a) This measurement provides the distribution of UL GTP packet delay between PSA UPF and NG-RAN. This measurement is split into subcounters per 5QI and subcounters per S-NSSAI. This measurement is only applicable to the case the PSA UPF and NG-RAN are time synchronized.

b) DER (n=1).

c) The measurement is obtained by the following method: For each GTP PDU monitoring response packet (packet i) for QoS monitoring, the PSA UPF records the following time stamps and information:

T3 received in the GTP-U header indicating the local time that the NG-RAN sent out the monitoring response packet to the UPF;

T4 that the monitoring response packet received by the PSA UPF;

The 5QI and S-NSSAI associated to the DL GTP PDU.

The PSA UPF 1) takes the following calculation for each GTP PDU monitoring response packets for each 5QI and each S-NSSAI respectively, and 2) increments the corresponding bin with the delay range where the result of 1) falls into by 1 for the subcounters per 5QI and subcounters per S-NSSAI.

$T4_i - T3_i$ d) Each measurement is an integer representing the number of GTP PDUs measured with the delay within the range of the bin.

e) GTP.DelayUlPsaUpfNgranDist.5QI.Bin, where Bin indicates a delay range which is vendor specific, and 5QI identifies the 5QI; GTP.DelayUlPsaUpfNgranDist.SNSSAI.bin, where Bin indicates a delay range which is vendor specific, and SNSSAI identifies the S-NSSAI.

f) EP_N3 (contained by UPFFunction); EP_N9 (contained by UPFFunction).

g) Valid for packet switched traffic.

h) 5GS.

5.4.x Round-trip packet delay between PSA UPF and NG-RAN 5.4.x.1 Average round-trip packet delay between PSA UPF and NG-RAN a) This measurement provides the average round-trip GTP packet delay between the PSA UPF and the NG-RAN. This measurement is split into subcounters per 5QI and subcounters per S-NSSAI. This measurement is only applicable to the case the PSA UPF and the NG-RAN are not time synchronized.

b) DER (n=1).

c) The measurement is obtained by the following method: For each DL GTP PDU (packet i) encapsulated with QFI, TEID, and QMP indicator for QoS monitoring, the PSA UPF records the following time stamps and information:

T1 that the DL GTP PDU was sent by the PSA UPF;

T2 received in the GTP-U header of the monitoring response packet indicating the local time that the DL GTP PDU was received by the NG-RAN:

T3 received in the GTP-U header of the monitoring response packet indicating the local time that the monitoring response packet was sent by the NG-RAN;

T4 that the monitoring response packet was received by the PSA UPF;

The 5QI and S-NSSAI associated to the DL GTP PDU.

The PSA UPF counts the number (N) of DL GTP PDUs encapsulated with QFI, TEID, and QMP indicator for each 5QI and each S-NSSAI respectively, and takes the following calculation for each 5QI and each S-NSSAI:

$$\frac{\sum_{i=1}^{N}((T4_i - T1)_i - (T3_i - T2_i))}{N}$$

d) Each measurement is a real number representing the average delay in microseconds.

e) GTP.RttDelayPsaUpfNgranMean.5QI, where 5QI identifies the 5QI; GTP.RttDelayPsaUpfNgranMean.SNSSAI, where SNSSAI identifies the S-NSSAI.

f) EP_N3 (contained by UPFFunction): EP_N9 (contained by UPFFunction).

g) Valid for packet switched traffic.

h) 5GS.

5.4.x.2 Distribution of round-trip packet delay between PSA UPF and NG-RAN a) This measurement provides the distribution of round-trip GTP packet delay between PSA UPF and NG-RAN. This measurement is split into subcounters per 5QI and subcounters per S-NSSAI. This measurement is only applicable to the case the PSA UPF and the NG-RAN are not time synchronized.

b) DER (n=1).

c) The measurement is obtained by the following method:

For each DL GTP PDU (packet i) encapsulated with QFI, TEID, and QMP indicator for QoS monitoring, the PSA UPF records the following time stamps and information:

T1 that the DL GTP PDU was sent by the PSA UPF:

T2 received in the GTP-U header of the monitoring response packet indicating the local time that the DL GTP PDU was received by the NG-RAN;

T3 received in the GTP-U header of the monitoring response packet indicating the local time that the monitoring response packet was sent by the NG-RAN;

T4 that the monitoring response packet was received by the PSA UPF;

The 5QI and S-NSSAI associated to the DL GTP PDU.

The PSA UPF 1) takes the following calculation for each DL GTP PDU (packet i) encapsulated with QFI, TEID, and QMP indicator for each 5QI and each S-NSSAI respectively, and 2) increments the corresponding bin with the delay range where the result of 1) falls into by 1 for the subcounters per 5QI and subcounters per S-NSSAI.

$(T4_i - T1_i) - (T3_i - T2_i)$ d) Each measurement is an integer representing the number of DL GTP PDUs measured with the delay within the range of the bin.

e) GTP.RttDelayPsaUpfNgranDist.5QI.Bin, where Bin indicates a delay range which is vendor specific, and 5QI identifies the 5QI; GTP.RttDelayPsaUpfNgranDist.SNSSAI.bin, where Bin indicates a delay range which is vendor specific, and SNSSAI identifies the S-NSSAI.

f) EP_N3 (contained by UPFFunction); EP_N9 (contained by UPFFunction).

g) Valid for packet switched traffic.

h) 5GS.

5.4.x One-way packet delay between PSA UPF and UE 5.4.x.1 DL packet delay between PSA UPF and UE 5.4.x.1.1 Average DL Packet Delay Between PSA UPF and UE a) This measurement provides the average DL packet delay between PSA UPF and UE. This measurement is split into subcounters per 5QI and subcounters per S-NSSAI. This measurement is only applicable to the case the PSA UPF and the NG-RAN are time synchronized.

b) DER (n=1).

c) The measurement is obtained by the following method:

For each DL GTP PDU (packet i) encapsulated with QFI, TEID, and QMP indicator for QoS monitoring, the PSA UPF records the following time stamps and information:

T1 that the DL GTP PDU was sent by the PSA UPF:

T2 received in the GTP-U header of the monitoring response packet indicating the local time that the DL GTP PDU was received by the NG-RAN;

The result of DL packet delay from NG-RAN to UE (including the delay within the NG-RAN and the delay on the Uu interface and denoted by DRdl herein) received in the GTP-U header of the monitoring response packet;

The 5QI and S-NSSAI associated to the DL GTP PDU.

The PSA UPF counts the number (N) of GTP PDU packets encapsulated with QFI, TEID, and QMP indicator for each 5QI and each S-NSSAI respectively, and takes the following calculation for each 5QI and each S-NSSAI:

$$\frac{\sum_{i=1}^{N}(T2_i - T1_i + DRdl_i)}{N}$$

d) Each measurement is a real number representing the average delay in microseconds.

e) GTP.DelayDlPsaUpfUeMean.5QI, where 5QI identifies the 5QI: GTP.DelayDlPsaUpfUeMean.SNSSAI, where SNSSAI identifies the S-NSSAI.

f) EP_N3 (contained by UPFFunction); EP_N9 (contained by UPFFunction).

g) Valid for packet switched traffic.

h) 5GS.

5.4.x.1.2 Distribution of DL Packet Delay Between PSA UPF and UE a) This measurement provides the distribution of DL packet delay between PSA UPF and UE. This measurement is split into subcounters per 5QI and subcounters per S-NSSAI. This measurement is only applicable to the case the PSA UPF and the NG-RAN are time synchronized.

b) DER (n=1).

c) The measurement is obtained by the following method:

For each DL GTP PDU (packet i) encapsulated with QFI, TEID, and QMP indicator for QoS monitoring, the PSA UPF records the following time stamps and information:

T1 that the DL GTP PDU was sent by the PSA UPF;

T2 received in the GTP-U header of the monitoring response packet indicating the local time that the DL GTP PDU was received by the NG-RAN:

The result of DL packet delay from NG-RAN to UE (including the delay within the NG-RAN and the delay on the Uu interface and denoted by DRdl herein) received in the GTP-U header of the monitoring response packet:

The 5QI and S-NSSAI associated to the DL GTP PDU.

The PSA UPF 1) takes the following calculation for each packet encapsulated with QFI, TEID, and QMP indicator for each 5QI and each S-NSSAI respectively, and 2) increments the corresponding bin with the delay range where the result of 1) falls into by 1 for the subcounters per 5QI and subcounters per S-NSSAI.

$T2_i - T1_i + DRdl_i$ d) Each measurement is an integer representing the number of GTP PDUs measured with the delay within the range of the bin.

e) GTP.DelayDlPsaUpfUeDist.5QI.bin, Where Bin indicates a delay range which is vendor specific, and 5QI identifies the 5QI: GTP.DelayDlPsaUpfUeDist.SNSSAI.bin. Where Bin indicates a delay range which is vendor specific, and SNSSAI identifies the S-NSSAI.

f) EP_N3 (contained by UPFFunction); EP_N9 (contained by UPFFunction).

g) Valid for packet switched traffic.

h) 5GS.

5.4.x.y UL packet delay between PSA UPF and UE 5.4.x.y.1 Average UL packet delay between PSA UPF and UE a) This measurement provides the average UL packet delay between PSA UPF and UE. This measurement is split into subcounters per 5QI and subcounters per S-NSSAI. This measurement is only applicable to the case the PSA UPF and the NG-RAN are time synchronized.

b) DER (n=1).

c) The measurement is obtained by the following method:

For each GTP PDU monitoring response packet (packet i) for QoS monitoring, the PSA UPF records the following time stamps and information:

T3 received in the GTP-U header of the monitoring response packet indicating the local time that the monitoring response packet was sent by the NG-RAN;

T4 that the monitoring response packet was received by the PSA UPF:

The result of UL packet delay from the UE to the NG-RAN (including the delay within the NG-RAN and the delay on the Uu interface and denoted by DRul herein) received in the GTP-U header of the monitoring response packet:

The 5QI and S-NSSAI associated to the GTP PDU.

The PSA UPF counts the number (N) of GTP PDU monitoring response packets for each 5QI and each S-NSSAI respectively, and takes the following calculation for each 5QI and each S-NSSAI:

$$\frac{\sum_{i=1}^{N}(T4_i - T3_i + DRul_i)}{N}$$

d) Each measurement is a real number representing the average delay in microseconds.

e) GTP.DelayUlPsaUpfUeMean.5QI, where 5QI identifies the 5QI; GTP.DelayUlPsaUpfUeMean.SNSSAI, where SNSSAI identifies the S-NSSAI.

f) EP_N3 (contained by UPFFunction); EP_N9 (contained by UPFFunction).

g) Valid for packet switched traffic.

h) 5GS.

5.4.x.y.2 Distribution of UL Packet Delay Between PSA UPF and UE a) This measurement provides the distribution of UL packet delay between PSA UPF and UE. This measurement is split into subcounters per 5QI and subcounters per S-NSSAI. This measurement is only applicable to the case the PSA UPF and the NG-RAN are time synchronized.

b) DER (n=1).

c) The measurement is obtained by the following method:

For each GTP PDU monitoring response packet (packet i) for QoS monitoring, the PSA UPF records the following time stamps and information:

T3 received in the GTP-U header of the monitoring response packet indicating the local time that the monitoring response packet was sent by the NG-RAN;

T4 that the monitoring response packet was received by the PSA UPF;

The result of UL packet delay from the UE to the NG-RAN (including the delay within the NG-RAN and the delay on the Uu interface and denoted by DRul herein) received in the GTP-U header of the monitoring response packet:

The 5QI and S-NSSAI associated to the GTP PDU.

The PSA UPF 1) takes the following calculation for each GTP PDU monitoring response packet (packet i) for each 5QI and each S-NSSAI respectively, and 2) increments the corresponding bin with the delay range where the result of 1) falls into by 1 for the subcounters per 5QI and subcounters per S-NSSAI.

$T2_i - T1_i + DRul_i$ d) Each measurement is an integer representing the number of GTP PDUs measured with the delay within the range of the bin.

e) GTP.DelayUlPsaUpfUeDist.5QI.bin, where Bin indicates a delay range which is vendor specific, and 5QI identifies the 5QI; GTP.DelayUlPsaUpfUeDist.SNSSAI.bin, where Bin indicates a delay range which is vendor specific, and SNSSAI identifies the S-NSSAI.

f) EP_N3 (contained by UPFFunction): EP_N9 (contained by UPFFunction).

g) Valid for packet switched traffic.

h) 5GS.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although an embodiment has been described with reference to specific example embodiments, it are evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a new radio (NR) network configured to operate as a random access channel (RACH) optimization management function, the apparatus comprising:
   processing circuitry configured to:
   consume a network function (NF) provisioning Management Service (MnS) with modifyMOIAttributes operation to configure targets for RACH optimization;
   consume a NF provisioning MnS with modifyMOIAttributes operation to enable a RACH optimization function for a NR cell;
   consume a performance assurance MnS with notifyFileReady or reportStreamData operation to collect RACH optimization-related measurements for the NR cell; and
   analyze RACH performance data of the RACH optimization-related measurements to evaluate RACH optimization performance for the NR cell; and
   a memory to store the RACH performance data,
   wherein attributes representing the targets for RACH optimization and control to enable RACH optimization function are defined in a RachOptimization information object class (IOC), and
   wherein the RachOptimization IOC is contained within a NRCellCU IOC, and is inherited from a Top IOC.

2. The apparatus of claim 1, wherein the processing circuitry is further configured to:
   determine, based on the RACH performance data, whether at least one of the targets for RACH optimization has been met; and
   in response to a determination that the at least one of the targets for RACH optimization has not been met, consume a provisioning MnS with modifyMOIAttributes operation to update the targets of the RACH optimization function.

3. The apparatus of claim 1, wherein the RachOptimization IOC contains attributes for the targets for RACH optimization:

| |
| --- |
| ueAccProbilityDistPerSSB |
| ueAccProbilityDistPerCSI |
| ueAccDelayProbilityDistPerSSB |
| ueAccDelayProbilityDistPerCSI |
| contentiousRACHAttemptsPerSSB |
| contentiousRACHAttemptsPerCSI. |

4. The apparatus of claim 3, wherein the attributes for the targets for RACH optimization are defined as:

| | | |
| --- | --- | --- |
| ueAccProbilityDistPerSSB | This is a list of target Access Probability ($AP_n$) for the RACH optimization function. Each instance $AP_n$ of the list is the probability that the UE gets access on the RACH channel per SSB within n number of preambles sent over an unspecified sampling period. This target is suitable for RACH optimization. allowedValues: Each element of the list, $AP_n$, is a pair (a, n) where a is the targetProbability (in %) and n is the number of preambles sent. The legal values for a are 25, 50, 75, 90. The legal values for n are 1 to 200. The number of elements specified is 4. The number of elements supported is vendor specific. The choice of supported values for a and n is vendor-specific. | type: <<data type>> multiplicity: 0 . . . * isOrdered: N/A isUnique: N/A defaultValue: None isNullable: True |
| ueAccProbilityDistPerCSI | This is a list of target Access Probability ($AP_n$) for the RACH optimization function. Each instance $AP_n$ of the list is the probability that the UE gets access on the RACH channel per CSI within n number of preambles sent over an unspecified sampling period. This target is suitable for RACH optimization. allowedValues: Each element of the list, $AP_n$, is a pair (a, n) where a is the targetProbability (in %) and n is the number of preambles sent. The legal values for a are 25, 50, 75, 90. | type: <<data type>> multiplicity: 0 . . . * isOrdered: N/A isUnique: N/A defaultvalue: None isNullable: True |

| | | |
|---|---|---|
| | The legal values for n are 1 to 200. The number of elements specified is 4. The number of elements supported is vendor specific. The choice of supported values for a and n is vendor-specific. | |
| ueAccDelayProbilityDistPerSSB | This is a list of target Access Delay probability ($AD_P$) for the RACH optimization function. Each instance $AD_P$ of the list is the target time before the UE gets access on the RACH channel per SSB, for the P percent of the successful RACH Access attempts with lowest access delay, over an unspecified sampling period. This target is suitable for RACH optimization. allowedValues: Each element of the list, $AD_p$, is a pair (p, d) where p is the targetProbability (in %) and a is the access delay (in milliseconds). The legal values for p are 25, 50, 75, 90. The legal values for d are 10 to 560. The number of elements specified is 4. The number of elements supported is vendor specific. The choice of supported values for a and b is vendor-specific. | type: <<data type>> multiplicity: 0 . . . * isOrdered: N/A isUnique: N/A defaultvalue: None isNullable: True |
| ueAccDelayProbilityDistPerCSI | This is a list of target Access Delay probability ($AD_P$) for the RACH optimization function. Each instance $AD_P$ of the list is the target time before the UE gets access on the RACH channel per CSI, for the P percent of the successful RACH Access attempts with lowest access delay, over an unspecified sampling period. This target is suitable for RACH optimization. allowedValues: Each element of the list, $AD_p$, is a pair (p, d) where p is the targetProbability (in %) and d is the access delay (in milliseconds). The legal values for p are 25, 50, 75, 90. The legal values for d are 10 to 560. The number of elements specified is 4. The number of elements supported is vendor specific. The choice of supported values for a and b is vendor-specific. | type: <<data type>> multiplicity: 0 . . . * isOrdered: N/A isUnique: N/A defaultvalue: None isNullable: True |
| contentiousRACHAttemptsPerSSB | This indicates the assigned target of the number of RACH attempts with contention detected divided by the total number of RACH attempts for each SSB. This target is suitable for RACH optimization. allowedValues: Integer 1 . . . 100 | type: <<data type>> multiplicity: 0 . . . * isOrdered: N/A isUnique: N/A defaultvalue: None isNullable: True |
| contentiousRACHAttemptsPerCSI | This indicates the assigned target of the number of RACH attempts with contention detected divided by the total number of RACH attempts for each CSI. This target is suitable for RACH optimization. allowedValues: Integer 1 . . . 100 | type: <<data type>> multiplicity: 0 . . . * isOrdered: N/A isUnique: N/A defaultvalue: None. |

5. The apparatus of claim 1, wherein attributes representing the RACHOptimization IOC contains a rachOptimizationControl attribute to enable or disable the RACH optimization function.

6. The apparatus of claim 3, wherein the rachOptimizationControl attribute is defined as:

| | | |
|---|---|---|
| rachOptimizationControl | This attribute determines whether the RACH Optimization function is enabled or disabled. allowedValues: On, Off | type: <<enumeration>> multiplicity: 1 isOrdered: N/A isUnique: N/A defaultValue: None isNullable: True. |

7. The apparatus of claim 1, wherein the targets and the RACH optimization-related measurements related to each target comprise:

| Performance measurements | Description | Related targets |
|---|---|---|
| Distribution of RACH preambles sent per SSB | Distribution of the number of preambles UEs sent to achieve synchronization per SSB, where the number of preambles sent corresponds to PREAMBLE_TRANSMISSION_COUNTER (see clause 5.1.1 in TS 38.321 [4]) in UE. | UE access delay probability per SSB |
| Distribution of RACH preambles sent per CSI | Distribution of the number of preambles UEs sent to achieve synchronization per CSI, where the number of preambles sent corresponds to PREAMBLE_TRANSMISSION_COUNTER (see clause 5.1.1 in TS 38.321 [4]) in UE. | UE access delay probability per CSI |
| Distribution of UEs access delay per SSB | Distribution of the time needed for UEs to successfully attach to the network per SSB. | Number of preambles send per SSB probability |
| Distribution of UEs access delay per CSI | Distribution of the time needed for UEs to successfully attach to the network per CSI. | Number of preambles send per CSI probability |
| Mean number of preambles received per cell | Mean number of dedicated, randomly at low range, or at high range preambles received per cell. | UE access delay probability per SSB |
| Mean number of preambles received per SSB | Mean number of dedicated, randomly at low range, or at high range preambles received per SSB. | UE access delay probability per SSB |
| Percentage of contentious RACH attempts per SSB | Percentage of contentious RACH attempts received per SSB | Percentage of contentious RACH attempts per SSB |
| Percentage of contentious RACH attempts per CSI | Percentage of contentious RACH attempts received per CSI | Percentage of contentious RACH attempts per SSI. |

8. The apparatus of claim 1, wherein the RACH optimization-related measurements comprise: mean number of RACH preambles received per cell, mean number of RACH preambles received per Synchronization Signal Block (SSB), distribution of RACH preambles per SSB sent, distribution of RACH preambles per Channel State Information (CSI) sent, distribution of RACH access delay per SSB, distribution of RACH access delay per CSI, percentage of contentious RACH attempts per SSB, percentage of contentious RACH attempts per CSI, number of user equipment (UE) RACH reports received per SSB, and number of user equipment (UE) RACH reports received per CSI.

9. A non-transitory computer-readable storage medium that stores instructions for execution by one or more processors configured to provide a random access channel (RACH) optimization management function, the one or more processors to configure the RACH optimization management function to, when the instructions are executed:
consume a network function (NF) provisioning Management Service (MnS) with modifyMOIAttributes operation to configure targets for RACH optimization;
consume a NF provisioning MnS with modifyMOIAttributes operation to enable a RACH optimization function for a NR cell;
consume a performance assurance MnS with notifyFileReady or reportStreamData operation to collect RACH optimization-related measurements for the NR cell; and
analyze RACH performance data of the RACH optimization-related measurements to evaluate RACH optimization performance for the NR cell,
wherein attributes representing the targets for RACH optimization and control to enable RACH optimization function are defined in a RachOptimization information object class (IOC), and
wherein the RachOptimization IOC is contained within a NRCellCU IOC, and is inherited from a Top IOC.

10. The medium of claim 9, wherein the one or more processors configure the RACH optimization management function to, when the instructions are executed:

determine, based on the RACH performance data, whether at least one of the targets for RACH optimization has been met; and in response to a determination that the at least one of the targets for RACH optimization has not been met, consume a provisioning MnS with modifyMOIAttributes operation to update the targets of the RACH optimization function.

11. The medium of claim 9, wherein the RachOptimization IOC contains attributes for the targets for RACH optimization:

ueAccProbilityDistPerSSB
ueAccProbilityDistPerCSI
ueAccDelayProbilityDistPerSSB
ueAccDelayProbilityDistPerCSI
contentiousRACHAttemptsPerSSB
contentiousRACHAttemptsPerCSI.

12. The medium of claim 11, wherein the attributes for the targets for RACH optimization are defined as:

| | | |
|---|---|---|
| ueAccProbilityDistPerSSB | This is a list of target Access Probability ($AP_n$) for the RACH optimization function. Each instance $AP_n$ of the list is the probability that the UE gets access on the RACH channel per SSB within n number of preambles sent over an unspecified sampling period. This target is suitable for RACH optimization. allowedValues: Each element of the list, $AP_n$, is a pair (a, n) where a is the targetProbability (in %) and n is the number of preambles sent. The legal values for a are 25, 50, 75, 90. The legal values for n are 1 to 200. The number of elements specified is 4. The number of elements supported is vendor specific. The choice of supported values for a and n is vendor-specific. | type: <<data type>> multiplicity: 0 ... * isOrdered: N/A isUnique: N/A defaultValue: None isNullable: True |
| ueAccProbilityDistPerCSI | This is a list of target Access Probability ($AP_n$) for the RACH optimization function. Each instance $AP_n$ of the list is the probability that the UE gets access on the RACH channel per CSI within n number of preambles sent over an unspecified sampling period. This target is suitable for RACH optimization. allowedValues: Each element of the list, $AP_n$, is a pair (a, n) where a is the targetProbability (in %) and n is the number of preambles sent. The legal values for a are 25, 50, 75, 90. The legal values for n are 1 to 200. The number of elements specified is 4. The number of elements supported is vendor specific. The choice of supported values for a and n is vendor-specific. | type: <<data type>> multiplicity: 0 ... * isOrdered: N/A isUnique: N/A defaultvalue: None isNullable: True |
| ueAccDelayProbilityDistPerSSB | This is a list of target Access Delay probability ($AD_P$) for the RACH optimization function. Each instance $AD_P$ of the list is the target time before the UE gets access on the RACH channel per SSB, for the P percent of the successful RACH Access attempts with lowest access delay, over an unspecified sampling period. This target is suitable for RACH optimization. allowedValues: Each element of the list, $AD_p$, is a pair (p, d) where p is the targetProbability (in %) and a is the access delay (in milliseconds). The legal values for p are 25, 50, 75, 90. The legal values for d are 10 to 560. The number of elements specified is 4. The number of elements supported is vendor specific. The choice of supported values for a and b is vendor-specific. | type: <<data type>> multiplicity: 0 ... * isOrdered: N/A isUnique: N/A defaultvalue: None isNullable: True |

-continued

| | | |
|---|---|---|
| ueAccDelayProbilityDistPerCSI | This is a list of target Access Delay probability ($AD_P$) for the RACH optimization function.<br>Each instance $AD_P$ of the list is the target time before the UE gets access on the RACH channel per CSI, for the P percent of the successful RACH Access attempts with lowest access delay, over an unspecified sampling period.<br>This target is suitable for RACH optimization.<br>allowedValues: Each element of the list, $AD_p$, is a pair (p, d) where p is the targetProbability (in %) and d is the access delay (in milliseconds).<br>The legal values for p are 25, 50, 75, 90.<br>The legal values for d are 10 to 560.<br>The number of elements specified is 4.<br>The number of elements supported is vendor specific. The choice of supported values for a and b is vendor-specific. | type: <<data type>><br>multiplicity:<br>0 . . . *<br>isOrdered: N/A<br>isUnique: N/A<br>defaultvalue: None<br>isNullable: True |
| contentiousRACHAttemptsPerSSB | This indicates the assigned target of the number of RACH attempts with contention detected divided by the total number of RACH attempts for each SSB. This target is suitable for RACH optimization.<br>allowedValues:<br>Integer 1 . . . 100 | type: <<data type>><br>multiplicity:<br>0 . . . *<br>isOrdered: N/A<br>isUnique: N/A<br>defaultvalue: None<br>isNullable: True |
| contentiousRACHAttemptsPerCSI | This indicates the assigned target of the number of RACH attempts with contention detected divided by the total number of RACH attempts for each CSI. This target is suitable for RACH optimization.<br>allowedValues:<br>Integer 1 . . . 100 | type: <<data type>><br>multiplicity:<br>0 . . . *<br>isOrdered: N/A<br>isUnique: N/A<br>defaultvalue: None. |

13. The medium of claim 9, wherein attributes representing the RACHOptimization IOC contains a rachOptimizationControl attribute to enable or disable the RACH optimization function.

14. The medium of claim 13, wherein the rachOptimizationControl attribute is defined as:

| | | |
|---|---|---|
| rachOptimizationControl | This attribute determines whether the RACH Optimization function is enabled or disabled.<br>allowedValues: On, Off | type:<br><<enumeration>><br>multiplicity: 1<br>isOrdered: N/A<br>isUnique: N/A<br>defaultValue: None<br>isNullable: True. |

15. The medium of claim 9, wherein the targets and the RACH optimization-related measurements related to each target comprise:

| Performance measurements | Description | Related targets |
|---|---|---|
| Distribution of RACH preambles sent per SSB | Distribution of the number of preambles UEs sent to achieve synchronization per SSB, where the number of preambles sent corresponds to PREAMBLE_TRANSMISSION_COUNTER (see clause 5.1.1 in TS 38.321 [4]) in UE. | UE access delay probability per SSB |
| Distribution of RACH preambles sent per CSI | Distribution of the number of preambles UEs sent to achieve synchronization per CSI, where the number of preambles sent corresponds to PREAMBLE_TRANSMISSION_COUNTER (see clause 5.1.1 in TS 38.321 [4]) in UE. | UE access delay probability per CSI |

-continued

| Performance measurements | Description | Related targets |
|---|---|---|
| Distribution of UEs access delay per SSB | Distribution of the time needed for UEs to successfully attach to the network per SSB. | Number of preambles send per SSB probability |
| Distribution of UEs access delay per CSI | Distribution of the time needed for UEs to successfully attach to the network per CSI. | Number of preambles send per CSI probability |
| Mean number of preambles received per cell | Mean number of dedicated, randomly at low range, or at high range preambles received per cell. | UE access delay probability per SSB |
| Mean number of preambles received per SSB | Mean number of dedicated, randomly at low range, or at high range preambles received per SSB. | UE access delay probability per SSB |
| Percentage of contentious RACH attempts per SSB | Percentage of contentious RACH attempts received per SSB | Percentage of contentious RACH attempts per SSB |
| Percentage of contentious RACH attempts per CSI | Percentage of contentious RACH attempts received per CSI | Percentage of contentious RACH attempts per SSI. |

16. The medium of claim 9, wherein the RACH optimization-related measurements comprise: mean number of RACH preambles received per cell, mean number of RACH preambles received per Synchronization Signal Block (SSB), distribution of RACH preambles per SSB sent, distribution of RACH preambles per Channel State Information (CSI) sent, distribution of RACH access delay per SSB, distribution of RACH access delay per CSI, percentage of contentious RACH attempts per SSB, percentage of contentious RACH attempts per CSI, number of user equipment (UE) RACH reports received per SSB, and number of user equipment (UE) RACH reports received per CSI.

17. An apparatus for a new radio (NR) network configured to operate as a random access channel (RACH) optimization management function, the apparatus comprising:

processing circuitry configured to:
consume a network function (NF) provisioning Management Service (MnS) with modifyMOIAttributes operation to configure targets for RACH optimization;
consume a NF provisioning MnS with modifyMOIAttributes operation to enable a RACH optimization function for a NR cell;
consume a performance assurance MnS with notifyFileReady or reportStreamData operation to collect RACH optimization-related measurements for the NR cell; and
analyze RACH performance data of the RACH optimization-related measurements to evaluate RACH optimization performance for the NR cell; and
a memory to store the RACH performance data,
wherein the targets and the RACH optimization-related measurements related to each target comprise:

| Performance measurements | Description | Related targets |
|---|---|---|
| Distribution of RACH preambles sent per SSB | Distribution of the number of preambles UEs sent to achieve synchronization per SSB, where the number of preambles sent corresponds to PREAMBLE_TRANSMISSION_COUNTER (see clause 5.1.1 in TS 38.321 [4]) in UE. | UE access delay probability per SSB |
| Distribution of RACH preambles sent per CSI | Distribution of the number of preambles UEs sent to achieve synchronization per CSI, where the number of preambles sent corresponds to PREAMBLE_TRANSMISSION_COUNTER (see clause 5.1.1 in TS 38.321 [4]) in UE. | UE access delay probability per CSI |
| Distribution of UEs access delay per SSB | Distribution of the time needed for UEs to successfully attach to the network per SSB. | Number of preambles send per SSB probability |
| Distribution of UEs access delay per CSI | Distribution of the time needed for UEs to successfully attach to the network per CSI. | Number of preambles send per CSI probability |
| Mean number of preambles received per cell | Mean number of dedicated, randomly at low range, or at high range preambles received per cell. | UE access delay probability per SSB |
| Mean number of preambles received per SSB | Mean number of dedicated, randomly at low range, or at high range preambles received per SSB. | UE access delay probability per SSB |
| Percentage of contentious RACH attempts per SSB | Percentage of contentious RACH attempts received per SSB | Percentage of contentious RACH attempts per SSB |
| Percentage of contentious RACH attempts per CSI | Percentage of contentious RACH attempts received per CSI | Percentage of contentious RACH attempts per SSI. |

18. The apparatus of claim 17, wherein the processing circuitry is further configured to:
- determine, based on the RACH performance data, whether at least one of the targets for RACH optimization has been met; and
- in response to a determination that the at least one of the targets for RACH optimization has not been met, consume a provisioning MnS with modifyMOIAttributes operation to update the targets of the RACH optimization function.

19. The apparatus of claim 17, wherein attributes representing the targets for RACH optimization and control to enable the RACH optimization function are defined in a RachOptimization information object class (IOC) to enable or disable the RACH optimization function and that contains a rachOptimizationControl attribute defined as:

| rachOptimizationControl | This attribute determines whether the RACH Optimization function is enabled or disabled. allowedValues: On, Off | type: <<enumeration>> multiplicity: 1 isOrdered: N/A isUnique: N/A defaultValue: None isNullable: True. |
|---|---|---|

20. The apparatus of claim 17, wherein the RACH optimization-related measurements comprise: mean number of RACH preambles received per cell, mean number of RACH preambles received per Synchronization Signal Block (SSB), distribution of RACH preambles per SSB sent, distribution of RACH preambles per Channel State Information (CSI) sent, distribution of RACH access delay per SSB, distribution of RACH access delay per CSI, percentage of contentious RACH attempts per SSB, percentage of contentious RACH attempts per CSI, number of user equipment (UE) RACH reports received per SSB, and number of user equipment (UE) RACH reports received per CSI.

* * * * *

UNITED STATES PATENT AND TRADEMARK OFFICE
CERTIFICATE OF CORRECTION

PATENT NO. : 11,785,480 B2
APPLICATION NO. : 17/167626
DATED : October 10, 2023
INVENTOR(S) : Chou et al.

Page 1 of 1

It is certified that error appears in the above-identified patent and that said Letters Patent is hereby corrected as shown below:

On the Title Page

In Column 2, under item (57) "Abstract", Line 4, delete "modify MOIAttributes" and insert --modifyMOIAttributes-- therefor In the Claims In Column 35, Line 20, in Claim 4, delete "a" and insert --d-- therefor In Column 35, Line 66, in Claim 4, delete "None." and insert --None isNullable: True-- therefor In Column 40, Line 68, in Claim 12, delete "a" and insert --d-- therefor Signed and Sealed this
Fourteenth Day of October, 2025

John A. Squires
*Director of the United States Patent and Trademark Office*